United States Patent
Peng

(10) Patent No.: US 9,479,203 B2
(45) Date of Patent: Oct. 25, 2016

(54) TRANSCEIVER CAPABLE OF IQ MISMATCH COMPENSATION ON THE FLY AND METHOD THEREOF

(75) Inventor: Chun-Hsien Peng, Xinyi Township, Nantou County (TW)

(73) Assignee: MEDIATEK INC., Hsin-Chu (TW)

( * ) Notice: Subject to any disclaimer, the term of this patent is extended or adjusted under 35 U.S.C. 154(b) by 597 days.

(21) Appl. No.: 13/339,666

(22) Filed: Dec. 29, 2011

(65) Prior Publication Data
US 2012/0263215 A1    Oct. 18, 2012

Related U.S. Application Data

(60) Provisional application No. 61/475,465, filed on Apr. 14, 2011.

(51) Int. Cl.
*H04B 1/40* (2015.01)
*H04B 1/04* (2006.01)

(52) U.S. Cl.
CPC ............... *H04B 1/0475* (2013.01); *H04B 1/40* (2013.01)

(58) Field of Classification Search
USPC .............. 375/221, 222, 296, 316; 455/552.1, 455/127.4, 132
See application file for complete search history.

(56) References Cited

U.S. PATENT DOCUMENTS

| | | | | |
|---|---|---|---|---|
| 5,751,114 A | * | 5/1998 | Dingsor ........................ | 375/222 |
| 6,697,436 B1 | * | 2/2004 | Wright et al. ................ | 375/296 |
| 7,443,783 B2 | * | 10/2008 | DeChamps et al. .......... | 370/208 |
| 7,463,866 B1 | * | 12/2008 | Chen .............................. | 455/91 |
| 7,570,923 B2 | * | 8/2009 | Kiss et al. .................. | 455/67.14 |
| 7,706,475 B1 | * | 4/2010 | Kopikare et al. ............. | 375/324 |
| 7,995,981 B2 | * | 8/2011 | Gao et al. ..................... | 455/296 |
| 8,311,083 B2 | * | 11/2012 | Ding et al. ..................... | 375/219 |
| 2003/0143966 A1 | * | 7/2003 | Kim et al. ..................... | 455/209 |
| 2005/0163251 A1 | * | 7/2005 | McCallister .................. | 375/296 |

(Continued)

FOREIGN PATENT DOCUMENTS

| | | |
|---|---|---|
| CN | 101080911 | 11/2007 |
| CN | 101548520 | 9/2009 |

(Continued)

OTHER PUBLICATIONS

Burglechner, S., et al.; "On the Estimation and Compensation of IQ Impairments in Direct Conversion Transmitters;" Proceedings of the 1st European Wireless Technology Conference; Oct. 2008; pp. 69-72.

(Continued)

*Primary Examiner* — Helene Tayong
(74) *Attorney, Agent, or Firm* — McClure, Qualey & Rodack, LLP

(57) ABSTRACT

A transceiver capable of IQ mismatch compensation on the fly and a method thereof. The transceiver comprises a transmitter circuit and a loop-back circuit. The transmitter circuit is configured to up-convert a modulation signal on the fly to generate a first RF signal. The loop-back circuit is configured to down-convert the first RF signal and then digitize the down-converted first RF signal to determine a first IQ mismatch parameter based on a first statistical measure of the digitized down-converted RF signal. The transmitter circuit is further configured to compensate for first IQ mismatch in the transmitter circuit according to the first IQ mismatch parameter to generate an IQ compensated modulation signal.

19 Claims, 18 Drawing Sheets

(56) References Cited

U.S. PATENT DOCUMENTS

| | | | |
|---|---|---|---|
| 2006/0063497 A1* | 3/2006 | Nielsen | 455/118 |
| 2006/0178165 A1* | 8/2006 | Vassiliou et al. | 455/552.1 |
| 2007/0097271 A1* | 5/2007 | Gao et al. | 348/724 |
| 2007/0202812 A1* | 8/2007 | Park et al. | 455/75 |
| 2007/0202825 A1* | 8/2007 | Park et al. | 455/226.1 |
| 2010/0195706 A1* | 8/2010 | Yanagisawa | H04L 27/2627 375/226 |

FOREIGN PATENT DOCUMENTS

| | | |
|---|---|---|
| WO | 2006/064435 | 6/2006 |
| WO | 2008/027441 | 3/2008 |
| WO | 2010/014805 | 2/2010 |

OTHER PUBLICATIONS

Valkama, M., et al.; "Blind Signal Estimation in Conjugate Signal Models with Application to I/Q Imbalance Compensation;" IEEE Signal Processing Letters; vol. 12; No. 11; Nov. 2005; pp. 733-736.

* cited by examiner

TRANSCEIVER CAPABLE OF IQ MISMATCH COMPENSATION ON THE FLY AND METHOD THEREOF

CROSS REFERENCE TO RELATED APPLICATIONS

This Application claims priority of U.S. Provisional Application No. 61/475,465, filed on Apr. 14, 2011, and the entirety of which is incorporated by reference herein.

BACKGROUND OF THE INVENTION

1. Field of the Invention

The present invention relates to IQ mismatch compensation, and in particular relates to a transceiver capable of IQ mismatch compensation on the fly and a method thereof.

2. Description of the Related Art

Wireless communication devices are commonly deployed in wireless communication systems to provide communication services such as voice, multimedia, data, broadcast, and messaging services. In a conventional wireless communication device such as a mobile phone, a digital baseband circuit block provides a data stream of complex, digital baseband data to a transmitter, where the transmitted baseband data are often carried on an orthogonal transmitter signal represented by real components and imaginary components, or, in-phase (I) and quadrature (Q) components. In the transmitter, the real component and the imaginary component of the transmitter signal are processed along a real-component circuit path and the imaginary component is processed along an imaginary-component circuit path, parallel to each other. The digital and analog signal processing along the real-component and the imaginary-component circuit paths are all in parallel, and may include multiplexing, filtering, power control, and up-sampling processes, and so on. The parallel signal processed transmitter signal is modulated to produce an analog radio frequency (RF) signal to be amplified and radiated onto the air interface from an antenna, providing communication data exchange with a base station of the communication system.

Ideally, the real and imaginary components are processed along parallel circuit paths in the transmitter, and the circuit elements along one path are perfectly identical, or "matched", with corresponding circuit elements along the other parallel channel. However, the corresponding circuit elements along the real and imaginary circuit paths often have slight or relatively significant differences from each other due to manufacturing process variations and geometrical layout differences, resulting in non-negligible amplitude differences ("IQ gain mismatch") and phase differences ("IQ phase mismatch") between the real and imaginary components that are processed along the parallel paths. The non-negligible IQ gain and phase mismatch may result in unacceptable degraded signal quality.

Typically, IQ mismatch compensation is deployed in the communication device to compensate for the IQ mismatch to increase the signal quality upon system startup or during a factory test. However, the system environment of the wireless communication device such as temperature changes during normal operation, lead to a change in the IQ mismatch in the device. Thus, devices capable of IQ mismatch compensation on the fly and methods thereof are in need, to accurately account for the IQ imbalance in the device when under normal operation.

BRIEF SUMMARY OF THE INVENTION

A detailed description is given in the following embodiments with reference to the accompanying drawings.

An embodiment of a transceiver capable of IQ mismatch compensation is disclosed, comprising a transmitter circuit and a loop-back circuit. The transmitter circuit is configured to up-convert a modulation signal on the fly to generate a first RF signal. The loop-back circuit is configured to down-convert the first RF signal, and then digitize the down-converted signal to determine a first IQ mismatch parameter based on a first statistical measure of the digitized down-converted RF signal. The transmitter circuit is further configured to compensate for first IQ mismatch in the transmitter circuit according to the first IQ mismatch parameter to generate an IQ compensated modulation signal.

Another embodiment of a compensation method is provided, performed by a transceiver to compensate for IQ mismatch thereof, comprising up-converting a modulation signal on the fly to generate a first RF signal; down-converting and digitizing the first RF signal; determining a first IQ mismatch parameter based on a first statistical measure of the digitized down-converted first RF signal; and compensating for first IQ mismatch in the transmitter circuit on the fly according to the first IQ mismatch parameter to generate an IQ compensated modulation signal.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
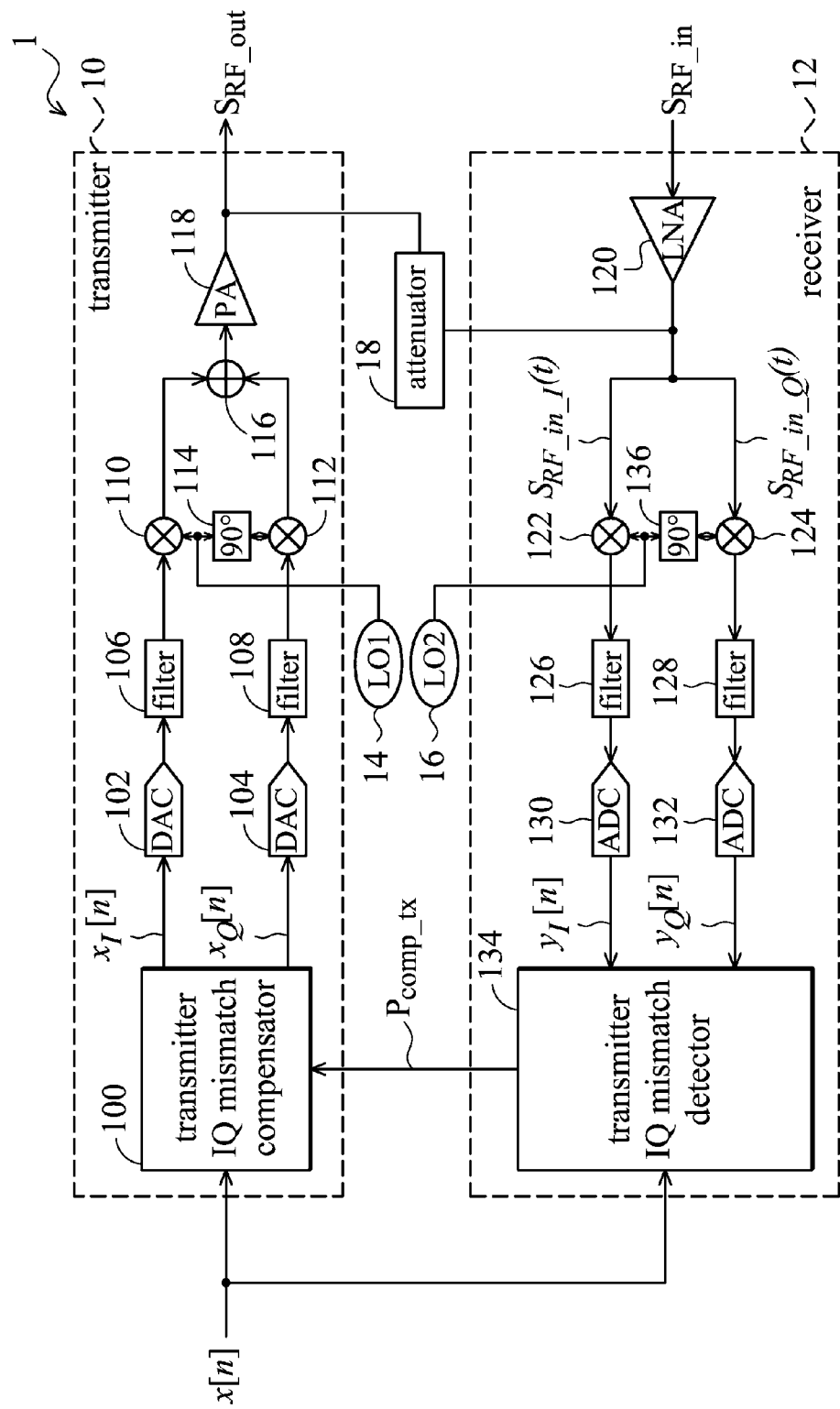
FIG. 1 is a block diagram of an exemplary transceiver 1 for a zero IF architecture according to an embodiment of the invention.

FIG. 1 is a block diagram of an exemplary transceiver 1 for a zero IF (direct conversion) architecture according to an embodiment of the invention. The transceiver 1 may be implemented in a communication device in time division duplexing (TDD) communication system, including a Worldwide Interoperability for Microwave Access (Wi-MAX), WiFi, bluetooth, Time Division Synchronous Code Division Multiple Access (TD-SCDMA), or TD-SCDMA Long Term Evolution (TD-LTE) system. In the TDD communication system, the communication devices communicate to one another through uplink and downlink communications at different times, and typically deploy asymmetrical uplink and downlink data rates. The communication device may be a base station, an access point, a hand-held cellular phone, a laptop computer equipped with a wireless adapter, or any device capable of wireless communication. The transceiver 1 is capable of detecting and compensating for IQ mismatch in a transmitter path in the transmitter 1, and comprises a transmitter 10 and a receiver 12 (loop-back circuit) coupled thereto, a first local oscillator 14 and a second local oscillator 16, and an attenuator 18. During transmission, the transmitter 10 up-converts a modulated baseband signal x[n] to generate and pass an RF signal (first RF signal) to an antenna (not shown) for radio transmission. During reception, the antenna receives and passes a modulated RF signal from an air interface to the receiver 12 for down-conversion to recover a baseband signal for subsequent digital processing. The first and second local oscillators supply first and second oscillation signals to the transmitter 10 and receiver 12 for frequency modulation and demodulation respectively. The transmitted RF signal $S_{RF\_out}$ is looped back to the receiver through the attenuator 18 to detect signal quality of the transmitted signal $S_{RF\_out}$ such as transmitter IQ mismatch. The IQ mismatch comprises phase and gain (amplitude) mismatch. The transceiver 1 employs Orthogonal Frequency Division Multiplexing (OFDM) technology to adapt to severe channel conditions and provide robust data transmission against any narrow band co-channel interference, intersymbol interference (ISI) and fading arising from multipath propagation. In the OFDM technology, each transmitted signal comprises an in-phase (I) component and a quadrature (Q) component, and the transceiver 1 incorporates circuits or modules to detect and compensate for IQ mismatch effects in the transmitter 10 and receiver 12, thereby increasing signal quality of the transmitted RF signal and the recovered baseband signal. In the zero IF architecture, the transmitter 10 up-converts the modulation baseband signal by the first oscillation signal with a first oscillation frequency that is substantially identical to a second oscillation frequency of the second oscillation signal, which is used to down-convert the RF signal in the receiver 12, i.e., the receiver 12 transforms the received RF signal to the baseband signal y[n] in a single stage. The first and second oscillation frequencies are radio frequencies (RF) that may be 900 MHz, 1900 MHz, or 2100 MHz in WCDMA systems, or may be 900 MHz, 2100 MHz, or 2.6 GHz in LTE systems, or others depending on the radio access technology (RAT) in use. The transceiver 1 may utilize a common local oscillator or two separate local oscillators generating and outputting the first and second oscillation signals with substantially the same oscillation frequency to the transmitter 10 and receiver 12 respectively. Although the transceiver in FIG. 1 only shows one transmitter and one receiver, the transceiver 1 may comprise one or more transmitter and receiver circuitry, and may comprise separated or integrated transmitter and receiver circuitry.

Conventionally, the transceiver only performs the IQ mismatch compensation upon power-on of the communication device or when the communication device undergoes a factory calibration test. During the transmission the system environment of the communication device such as temperature may change, such that the conventional transceiver is unable to correct the gain and phase IQ imbalance due to the change in the system environment under the normal operation. Consequently the signal quality of the transmitted RF signal and received baseband signal is degraded. In the embodiment, the transceiver 1 compensates for the IQ mismatch on the fly as the communication device is under the normal operation, so that the IQ imbalance in the transmitter 10 and the receiver 12 can be corrected as the system environment changes, which may include a change in temperature or power supply, thereby increasing signal quality of the transmitted and received signals in comparison to the conventional art.

The term "on the fly" refers to performing a particular type of signal processing without stopping normal operation of the transceiver 1. The on-the-fly IQ mismatch compensation refers to performing IQ mismatch detection and compensation to the communication signal without hindering, interrupting or stopping the normal operation of the transceiver 1, wherein the normal operation includes circuit initialization, data transmission, data reception, and every operation after power-on. In some implementations, the on-the-fly IQ compensation involves determining and compensating for the IQ mismatch at a regular time interval when the transceiver is in operation. In other implementation, the on-the-fly IQ compensation is carried out whenever a specific environment condition is met, e.g., the ambient temperature has changed, while the transceiver is performing any other normal operation. In any case, the on-the-fly process is carried out by a number of times after power-on, without any interruption to the normal process.

The transmitter 10 comprises a transmitter IQ mismatch compensator 100, Digital-to-Analog Converters (DACs) 102 and 104, filters 106 and 108, mixers 110 and 112, a 90° phase shifter 114, an adder 116, and a Power Amplifier (PA) 118. The transmitter IQ mismatch compensator 100 is coupled to the DACs 102 and 104, the filters 106 and 108, the mixers 110 and 112, both coupled to the 90° phase shifter 114 and an adder 116, and subsequently to the PA 118. Under a normal transmission operation, the transmitter 10 converts the baseband modulation signal x[n] from digital to analog at the DACs 102 and 104 to an analog signal x(t), filters off unwanted high frequency components in the analog signal x(t) at the filters 106 and 108, and up-converts the signal x(t) with the first oscillation signal to generate and output the transmitted RF signal $S_{RF\_out}(t)$ to the antenna for transmission. The signal path along the DAC 102, the filter 106, and the mixer 110 is referred to as an I-path of the transmitter 10, which receives the in-phase $x_I(t)$ component of the baseband modulation signal to generate the in-phase component of an RF signal. The baseband modulation signal x[n] and RF signal y(t) are orthogonal signals comprising an in-phase component and a quadrature component. The signal path along the DAC 104, the filter 108, and the mixer 112 is referred to as a Q-path of the transmitter 10, which receives the quadrature component $x_Q(t)$ of the baseband modulation signal to generate the quadrature component of the RF signal. The 90° phase shifter 114 shifts the phase of the first oscillation signal by 90 degrees to modulate the quadrature component of the baseband modulation signal. The in-phase component and the quadrature component of the RF signal y(t) are combined at the adder 116 and transmitted to the antenna through the PA 118, which amplifies the RF signal y(t) according to an allocated power before being transmitted by the antenna. In the embodiment, the filters 106 and 108 may be low-pass filters.

The baseband modulation signal x[n] comprises a predetermined data length L, and each data in the baseband modulation signal is substantially, mutually, and statistically independent or decorrelated to one another. During the transmitter IQ calibration on the fly procedure, the transmitter 10 executes the baseband modulation signal x[n] with a predetermined data length L along the transmission path in the transmitter 10 to generate the transmitted RF signal $S_{RF\_out}$, and each mutually, and statistically independent baseband data x[n] undergoes the same set of function of gain and phase alternation with respect to the in-phase and quadrature components to produce the transmitted RF signal $S_{RF\_out}$. Thus, an IQ mismatch detector (in the receiver 12) is configured to separate an independent data in the transmitted RF signal $S_{RF\_out}$ from one another to derive a compensation parameter $P_{comp\_tx}$ (first IQ compensation parameter), such that when the transmitter IQ mismatch compensator 100 corrects the transmitter IQ mismatch using the compensation parameter $P_{comp\_tx}$, the statistical independence of each data in the transmitted RF signal $S_{RF\_out}$ is maximized, and the statistical dependence between data in the signal $S_{RF\_out}$ is minimized. The transmitter IQ mismatch compensator 100 compensates for the transmitter IQ mismatch on the fly, so that the transmitter 10 can compensate for the transmitter IQ mismatch when a system environment change is detected in the transmitter 10. The system environment includes temperature or power supply. In some implementations, the transmitter 10 employs the modulation signal x[n] for normal data transmission to determine the transmitter IQ mismatch when the normal transmission is ongoing. In other implementations, the transmitter 10 utilizes a predetermined test modulation signal x[n] for the IQ mismatch detection. Upon power-on, the oscillation signals supplied to the transmitter 10 and receiver 12 may be initialized at different phases, the initial phase difference is the phase difference between initialized phases of the first and second oscillation signals. In some implementations, the transmitter IQ mismatch compensator 100 also compensates for an initial phase effect.

The direct conversion receiver 12 comprises a Low Noise Amplifier (LNA) 120, mixers 122 and 124, a 90° phase shifter 136, filters 126 and 128, Analog-to-Digital Converters (ADCs) 130 and 132, and a transmitter IQ mismatch detector 134. The LNA 120 is coupled to mixers 122 and 124, both coupled to the 90° phase shifter 136, then to the filters 126 and 128, the ADCs 130 and 132, and subsequently to the transmitter IQ mismatch detector 134. The received RF signal $S_{RF\_in}$ (second RF signal) is directly translated to baseband, i.e., zero intermediate frequency stage. After the down-conversion, the DC or 0 Hz frequency falls in the middle of the down-converted band. The receiver 12 amplifies the received RF signal by the LNA 120, down-converts the amplified RF signal with the second oscillation signal by the mixers 122 and 124, filters off unwanted high frequency components in the down-converted signal y(t) by the filters 126 and 128, and transforms the signal from analog to digital by the ADCs 130 and 132 to produce discrete time-domain baseband signal y[n] for signal processing. The signal path along the mixer 122, the filter 126, and the ADC 130 is referred to as an I-path of the receiver 12, which receives the in-phase $S_{RF\_in\_I}(t)$ component of the RF modulation signal to generate the in-phase component $y_I[n]$ of a baseband signal. The input RF signal $S_{RF\_in}$ may be retrieved from air interface via an antenna (not shown) or from an on-chip device such as a signal generator or a transmitter front end. The modulation signal x(t) and RF signal y(t) are orthogonal signals comprising an in-phase component and a quadrature component. The signal path along the mixer 124, the filter 128, and the ADC 132 is referred to as a Q-path of the transmitter 10, which receives the quadrature component $S_{RF\_in\_Q}(t)$ of the RF modulation signal to generate a quadrature component $y_Q[n]$ of the baseband signal. The 90° phase shifter 136 shifts the phase of the second oscillation signal by 90 degrees to demodulate the quadrature component of the RF signal. The receiver 12 may further comprise a receiver mismatch detector (not shown) and a receiver mismatch compensator (not shown) to detect and compensate for receiver IQ mismatch in the receiver 12. The filters 126 and 128 may be low-pass filters.

The transmitter IQ mismatch detector 134 detects the transmitter IQ mismatch on the fly based on a statistical measure of signal components in the feedback transmitted RF signal $S_{RF\_out}$ to output the compensation parameter $P_{comp\_tx}$ (first IQ compensation parameter) to the transmitter IQ mismatch compensator 100 for the transmitter IQ mismatch compensation. The transmitter IQ mismatch detector 134 determines the statistical measure to generate the compensation parameter $P_{comp\_tx}$ such that when the IQ mismatch compensator 100 compensates the baseband modulation data x[n] with the compensation parameter $P_{comp\_tx}$, the statistical independence of each signal component in the feedback transmitted RF signal $S_{RF\_out}$ is increased or maximized and statistical dependence therebetween is reduced or minimized. The statistical measure represents the statistical correlation between signal components in the transmitted RF signal $S_{RF\_out}$.

In some implementations, the receiver 12 uses the received RF signal $S_{RF\_in}$ to perform receiver IQ mismatch compensation on the fly during the normal receiving operation. In other implementations, the receiver 12 performs the receiver IQ mismatch compensation only during the power-on procedure or manufacturer testing.

The transceiver 1 according to the embodiment is adaptive to changes in the system environment, and capable of providing IQ mismatch calibration on the fly during the normal operation of the transmitter 10 and receiver 12 to account for the variation in the IQ mismatch due to the system environment change. In some implementations, the transceiver 1 also incorporates a single tone IQ mismatch compensation during the power-on procedure to speed up the compensation process, then performs the on the fly IQ mismatch compensation approach disclosed in the present embodiment during the normal operation to account for the system environment change. The single tone IQ compensation utilizes the transmitter 10 to execute a baseband single test tone and loop the outcome back to the baseband stage of the receiver via the feedback path. The receiver then compares the feedback baseband data with the sent baseband single test tone to detect an IQ mismatch therebetween, which in turn is used to compensate for the IQ imbalance in the transmitter. The single tone IQ compensation is executed only once upon the startup of the transceiver system.

Figure 2A:
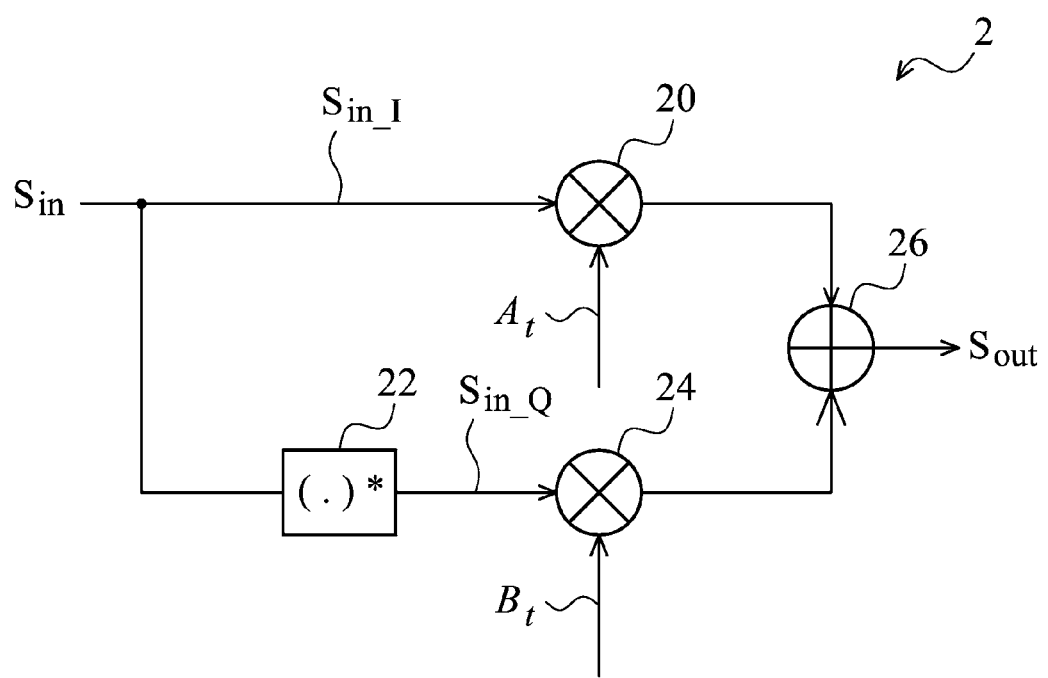
FIG. 2A is a block diagram of an exemplary IQ mismatch compensator 2 according to an embodiment of the invention.

FIG. 2A illustrates a block diagram of an exemplary IQ mismatch compensator 2 according to an embodiment of the invention, which can be implemented as the transmitter IQ mismatch compensator 100 for the transmitter IQ mismatch compensation or the receiver mismatch compensator for the receiver IQ mismatch compensation. The IQ mismatch compensator 2 comprises a first complex multiplier 20, a complex conjugate unit 22, a second complex multiplier 24, and a complex adder 26. The first complex multiplier 20 and the complex conjugate unit 22 in conjunction with the second complex multiplier 24 are coupled together through the complex adder 26. The transmitter IQ mismatch compensator 100 utilizes the first compensation parameter $P_{comp\_tx}$ to correct the IQ imbalance between the I-path and Q-path of the transmitter 10. In the implementation in FIG. 2, the first compensation parameter $P_{comp\_tx}$ comprises a wanted signal parameter $A_t$ compensating for a wanted signal component in the feedback transmitted RF signal $S_{RF\_out}$ and an unwanted image signal parameter $B_t$ compensating for an unwanted image signal in the fedback transmitted RF signal $S_{RF\_out}$ resulting from the IQ mismatch in the transmitter 10. The IQ mismatch compensator 2 receives an input signal $S_{in}$ to be compensated, extracts the unwanted image component by the complex conjugate unit 22, adjusts the wanted signal component with the parameter $A_t$ at the first complex multiplier 20 and unwanted image signal with the parameter $B_t$ at the second complex multiplier 24, then combines the adjusted results by the complex adder 26 to derive an compensated output signal $S_{out}$.

Figure 3A:
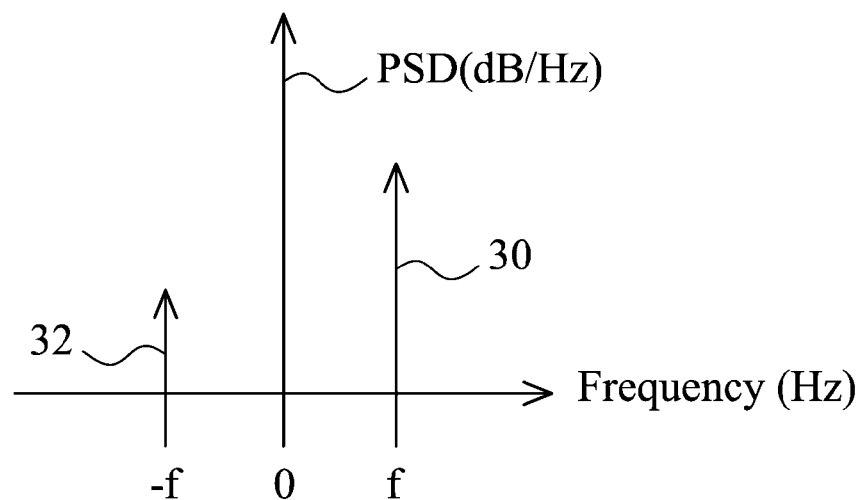
FIGS. 3A and 3B are frequency spectrum diagrams indicating signal components before and after IQ mismatch compensation.
Figure 3B:
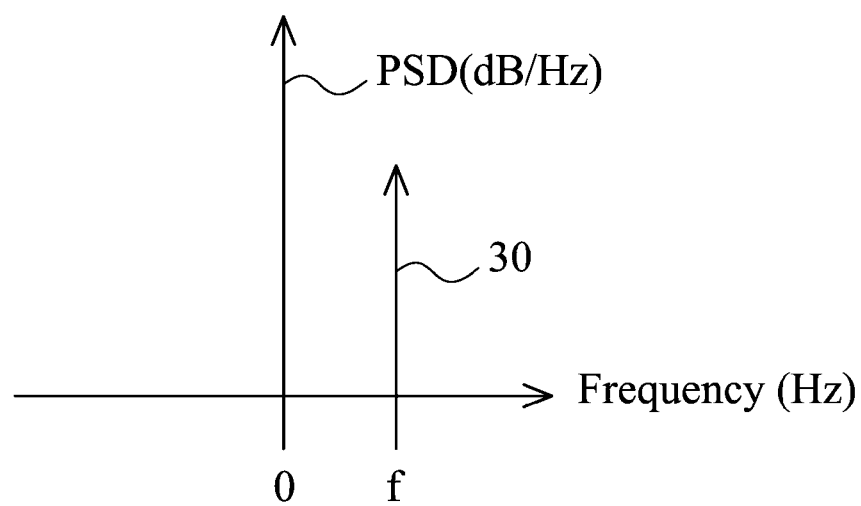

FIG. 3A depicts a frequency spectrum diagram indicating signal components before IQ mismatch compensation, comprises an wanted signal component 30 and an unwanted image signal component 32 due to the IQ imbalance, and both signal components are present in an input signal Sin of the IQ mismatch compensator 2. The IQ mismatch compensator 2 is adapted to remove the image signal component 32 by maximizing the statistical independence of each data in the transmitted RF signal $S_{RF\_out}$, resulting in a compensated signal as shown in FIG. 3B, which depicts a frequency spectrum diagram indicating the wanted signal component 30 after IQ mismatch compensation by the IQ mismatch compensator 2.

Figure 2B:
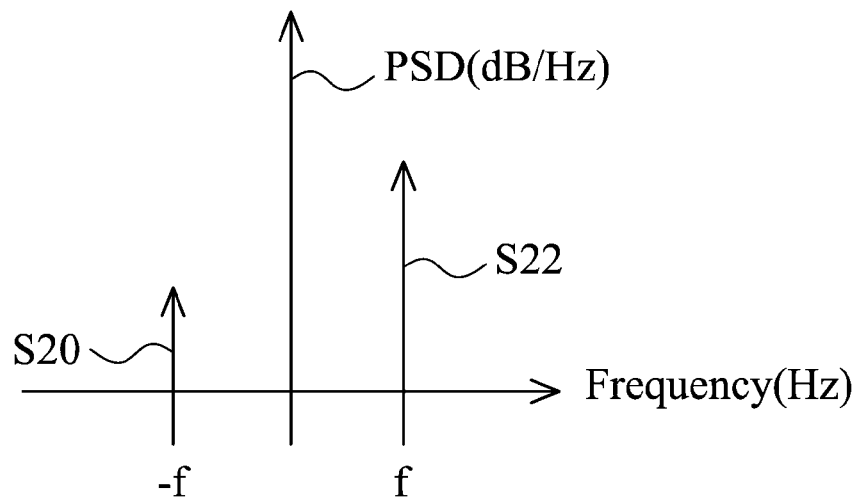
FIGS. 2B and 2C show frequency spectrum diagrams indicating signal components on the I-path and Q-path of the IQ mismatch compensator 2.
Figure 2C:
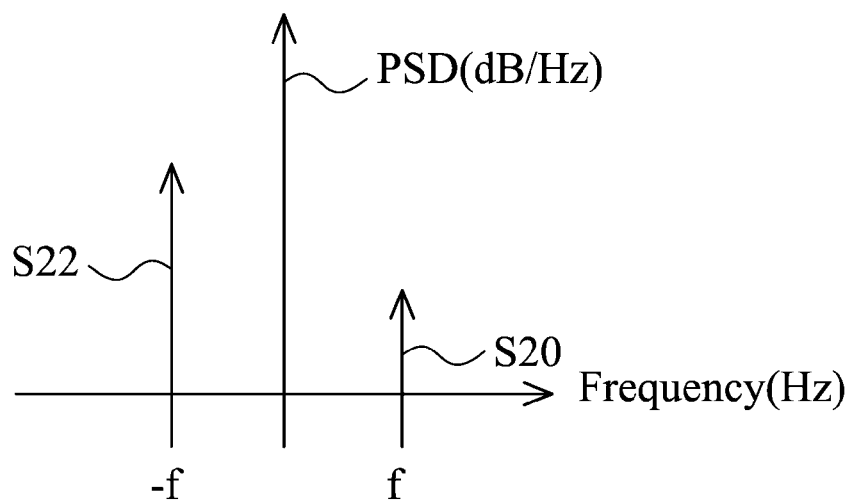

Please refer to FIGS. 2B and 2C, further detailing signal components in the signals $S_{in\_I}$ and $S_{in\_Q}$ in the IQ mismatch compensator 2 respectively. The to-be-compensated signal $S_{in}$ in FIG. 2A includes one wanted signal component and one image signal when the system is IQ imbalanced. Refer to FIG. 2B, the signal $S_{in}$ or $S_{in\_I}$ is the combination of two signals, the wanted signal component S22 and image signal component S20. Now turn to FIG. 2C, the conjugate form of the $S_{in\_I}$, i.e. $S_{in\_Q}$ in FIG. 2A, also includes one wanted signal component S22 and one image signal component S20. The IQ imbalance compensation in the embodiment combines the products $A_t S_{in\_I}$ and $B_t S_{in\_Q}$ from the top and bottom paths to produce the compensated signal $S_{out}$, which contains only wanted signal components therein. By utilizing statistical signal processing algorithms such as whitening, independent component analysis, and source separation methods, or the likes, the compensation parameters $A_t$ and $B_t$ can be computed such that the $S_{out}=A_t S_{in\_I}+B_t S_{in\_Q}$ only includes wanted components.

Figure 2D:
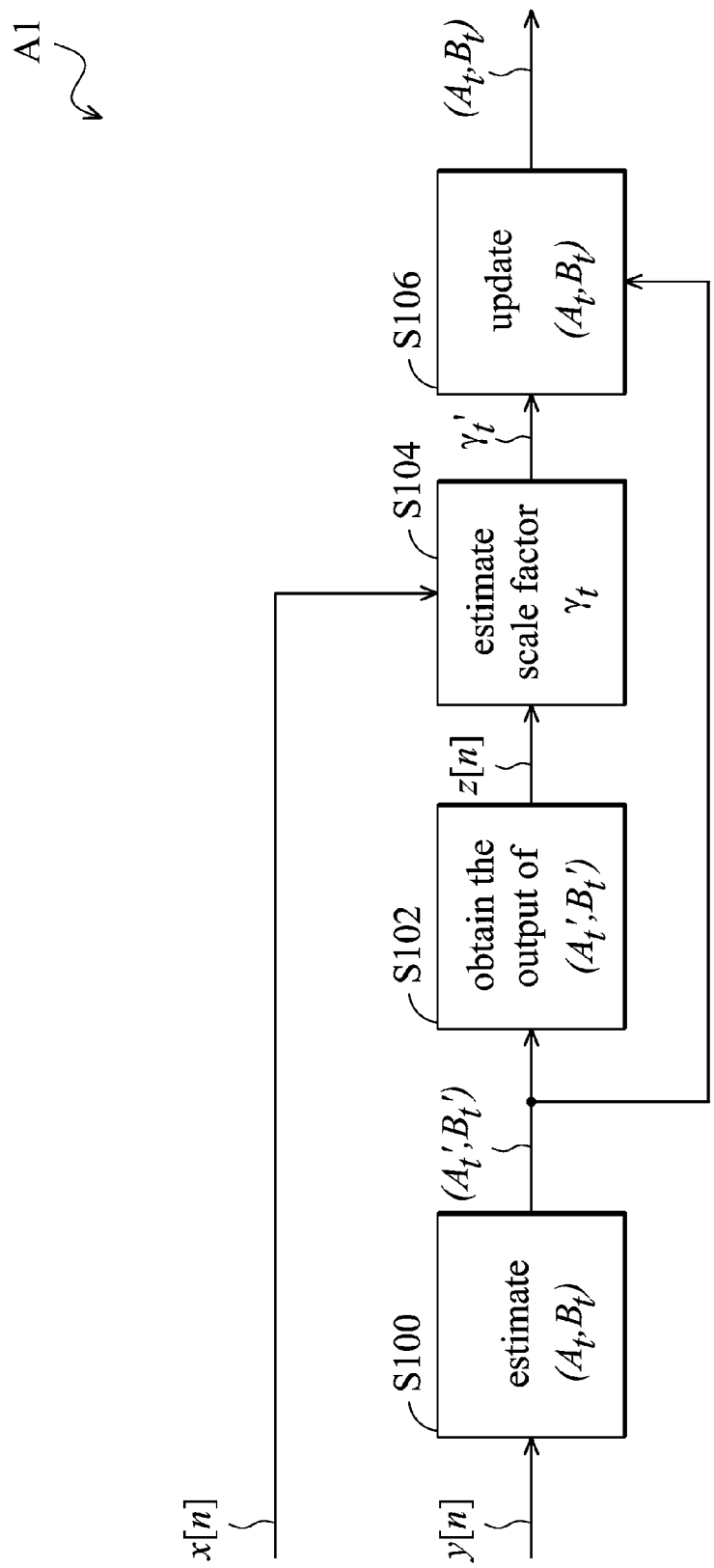
FIG. 2D is a flowchart of a transmitter IQ calibration algorithm according to an embodiment of the invention.

FIG. 2D is a flowchart detailing a transmitter IQ calibration algorithm A1 according to an embodiment of the invention, incorporating the transceiver 1 in FIG. 1 and the IQ mismatch compensator 2 in FIG. 2A. Upon initialization of the transmitter IQ calibration algorithm A1, the compensation parameter $P_{comp\_tx}$ comprising a first parameter $A_t$ and a second parameter $B_t$ is reset such that the first parameter $A_t$ is 1 and the second parameter $B_t$ is 0. In Step S100, the transmitter IQ mismatch detector 134 estimates the signal parameters $A_t$ and $B_t$ based on the received baseband signal y[n] according to the statistical signal processing algorithms disclosed in the preceding paragraphs to generate estimated signals parameters $A_t'$ and $B_t'$ (S100). The transmitter IQ mismatch compensator 100 then compensates the modulation signal x[n] with the estimated compensation parameters $A_t'$ and $B_t'$ to output a compensated signal z[n] (S102). The transmitter IQ mismatch compensator 100 determines the scale factor $\gamma_t$, by evaluating the cross-correlation between the baseband modulation signal x[n] and the IQ mismatch compensated modulation signal z[n] by the relationship $\gamma_t=E\{z[n]x^*[n]\}$ (S104). The transmitter IQ mismatch compensator 100 then updates the transmitter compensation parameters $A_t$ and $B_t$ according to the estimated compensation parameters $A_t'$ and $B_t'$ and the scale factor $\gamma_t$, (S106) by:

$$\overline{A_t} = \frac{1}{\gamma_t}A_t'A_t + \left(\frac{1}{\gamma_t}B_t'\right)*B_t \qquad \text{Eq. (1)}$$

$$\overline{B_t} = \frac{1}{\gamma_t}B_t'A_t + \left(\frac{1}{\gamma_t}A_t'\right)*B_t \qquad \text{Eq. (2)}$$

where $\gamma_t$, is the scale factor;

$A_t$ and $B_t$ are previous compensation parameters for the wanted and unwanted signal components;

$A_t'$ and $B_t'$ are the estimated compensation parameters for the wanted and unwanted signal components from the transmitter IQ mismatch detector 134; and $\overline{A_t}$ and $\overline{B_t}$ are updated compensation parameters for the wanted and unwanted signal components.

Figure 4:
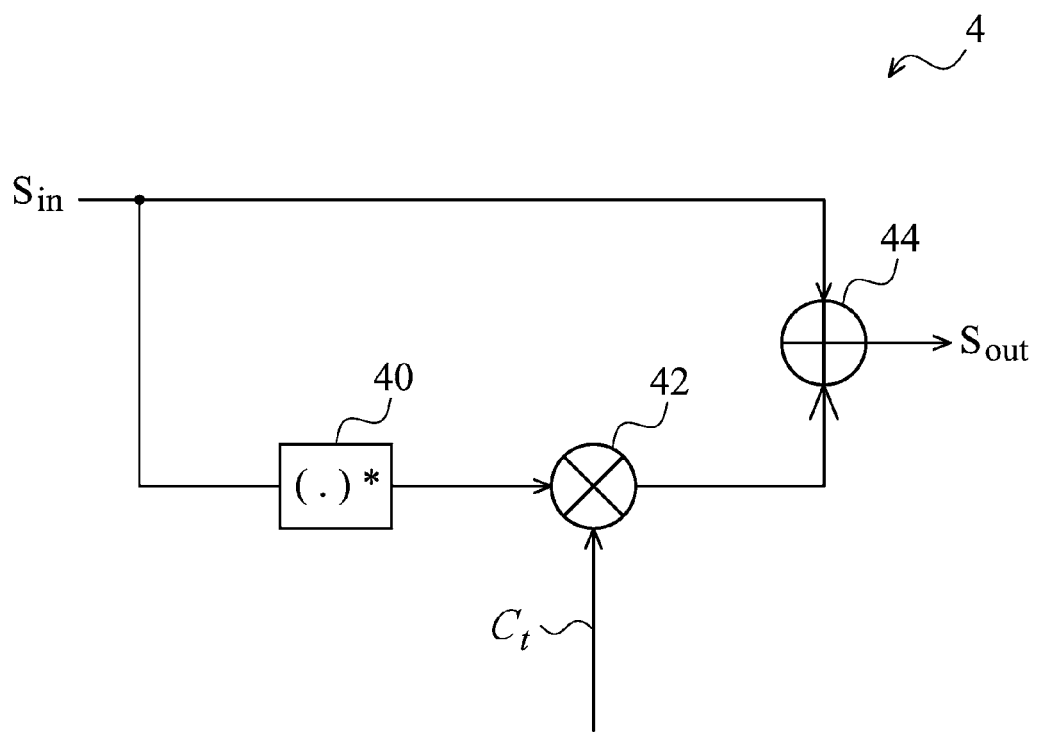
FIG. 4 is a block diagram of an exemplary IQ mismatch compensator 4 according to another embodiment of the invention.

FIG. 4 is a block diagram of an exemplary IQ mismatch compensator 4 according to another embodiment of the invention, which can also be implemented for the transmitter or receiver IQ mismatch compensation in FIG. 1, and comprises a complex conjugate unit 40, a complex multiplier 42, and a complex adder 44. In the implementation in FIG. 4, the first compensation parameter $P_{comp\_tx}$ comprises an unwanted image signal parameter $C_t$, which compensates for the unwanted image signal in FIG. 3A due to the IQ mismatch. The wanted signal component of the input signal Sin is passed along the top path of the circuit 4, while the unwanted image signal component is processed along the complex conjugate unit 40 and the complex multiplier 42. The unwanted image signal of the input signal Sin is extracted by the complex conjugate unit 40, and reduced or removed at the complex multiplier 42 using the parameter $C_t$. The result thereof is combined with the wanted signal component by the complex adder 44 to derive the compensated output signal $S_{out}$.

Figure 5:
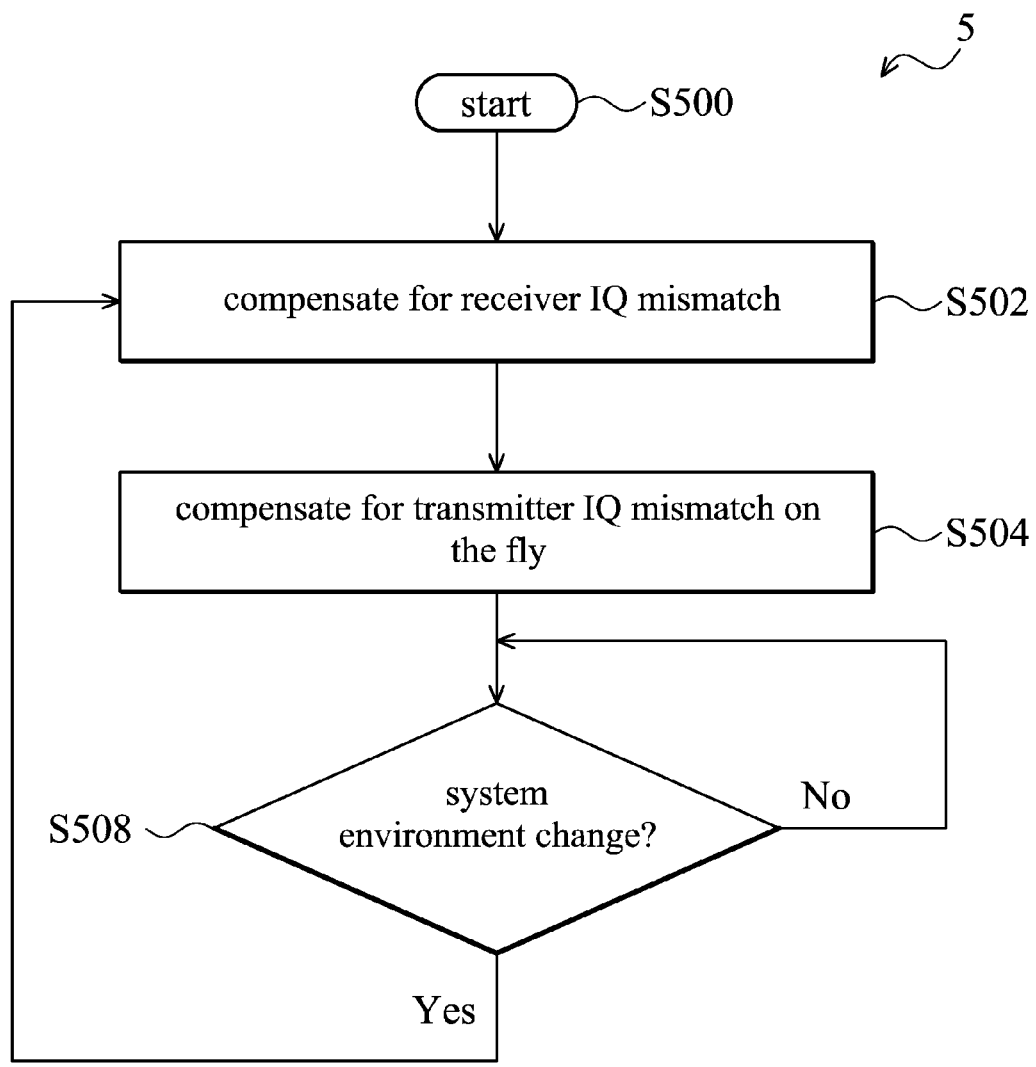
FIG. 5 is a flowchart of an exemplary IQ mismatch compensation method 5 according to an embodiment of the invention.

FIG. 5 is a flowchart of an exemplary IQ mismatch compensation method 5 according to an embodiment of the invention, incorporating the transceiver 1 for the direct conversion architecture in FIG. 1. The transceiver 1 is initialized to transmit and receive the communication data upon startup (S500), compensates for the receiver IQ mismatch by the on the fly IQ compensation approach or external test tone (S502), performs the transmitter IQ mismatch compensation on the fly for the transmitter 10 via the compensated receiver circuit 12 (S504). The transmitter IQ mismatch compensation on the fly comprises compensating for the initial phase mismatch between the transmitter 10 and receiver 12 by applying a scale factor to the baseband modulation signal x[n]. Next, the transceiver 1 checks whether the system environment thereof is changed to determine whether another round of the IQ mismatch compensation on the fly is in need (S508). If so, the IQ mismatch compensation method 5 returns to step S504 to perform the on-the-fly IQ mismatch compensation for the transmitter 10, and continues monitoring for any system environment change if otherwise (S508). Although the IQ mismatch compensation method 5 returns to step S504 to recalibrate the transmitter IQ mismatch upon detecting the system environment change in Step S508, in some embodiments, the compensation method 5 may go back to Step S502 instead and execute both the receiver and transmitter IQ compensation on the fly once again. In some implementations, the receiver 12 may incorporate the single tone IQ mismatch compensation procedure disclosed in FIG. 1 and a single test tone from an external signal generator (not shown) to perform the receiver IQ imbalance compensation in Step S504. In other implementations, the receiver 12 adapts the on-the-fly IQ compensation procedure using the received modulation signal Sin under normal operation to determine and compensate for the receiver IQ mismatch therein, i.e., the receiver 12 processes the received modulation signal Sin along the transmitter path to derive a discrete time-domain baseband signal and performs a statistical independence analysis on the discrete time-domain baseband signal to determine a receiver IQ compensation parameter, which in turn is used to reduce or remove the receiver IQ mismatch. The detailed receiver on-the-fly IQ compensation procedure is explained in FIG. 6. The detailed transmitter on-the-fly IQ compensation procedure is provided in FIG. 7. The mismatch detector in the receiver 12 determines the scale factor based on the baseband modulation signal x[n] and compensated baseband modulation signal z[n]. The detailed initial phase mismatch compensation procedure is disclosed in FIG. 8.

Figure 6:
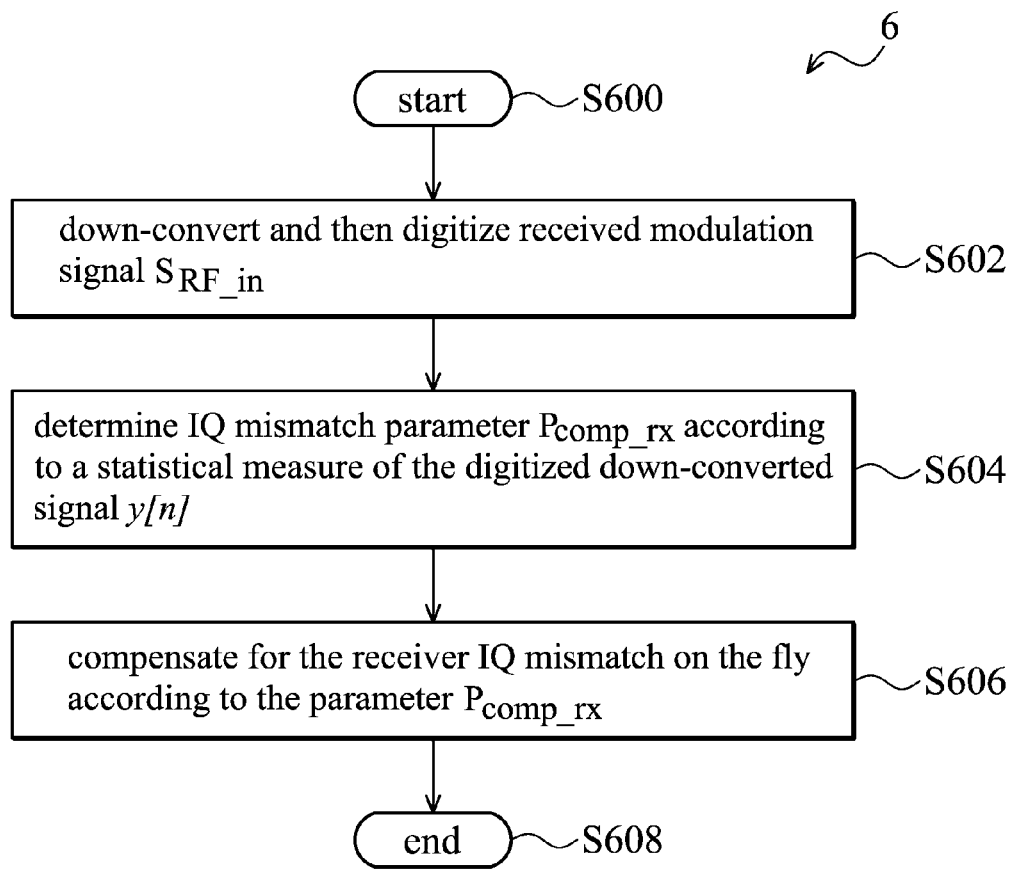
FIG. 6 is a flowchart of an exemplary IQ mismatch compensation method 6 for a receiver according to an embodiment of the invention.

FIG. 6 is a flowchart of an exemplary IQ mismatch compensation method 6 for a receiver according to an embodiment of the invention, incorporated in the step S502 in FIG. 5. The receiver IQ mismatch compensation method 6 incorporates the transceiver 1 in FIG. 1. Upon startup, the receiver 12 is initialized for retrieving RF modulation signals from an air interface (S600). When the antenna receives the RF modulation signal Sin during the normal operation, the receiver 12 performs down-conversion, filtering, and translating the modulation signal into discrete time-domain to generate baseband modulation signal y[n] for subsequent signal processing (S602). Next, the receiver IQ mismatch detector in the receiver 12 obtains the discrete baseband modulation signal y[n] to determine the receiver IQ compensation parameter $P_{comp\_rx}$ based on the statistical independence of each baseband modulation signal y[n] (S604), the receiver IQ mismatch compensator in the receiver can compensate for the receiver IQ imbalance on the fly according to the receiver IQ compensation parameter $P_{comp\_rx}$ to reduce or minimize the statistical correlation between each discrete baseband modulation signal y[n] (S606). The receiver IQ compensation method is then completed and exited (S608). The receiver IQ mismatch compensator can be implemented by the circuits in FIG. 2 or FIG. 4. The receiver 12 utilizes the method 6 to calibrate the receiver IQ imbalance on the fly, providing updated IQ imbalance calibration without disrupting the normal operation of the communication device.

Figure 7:
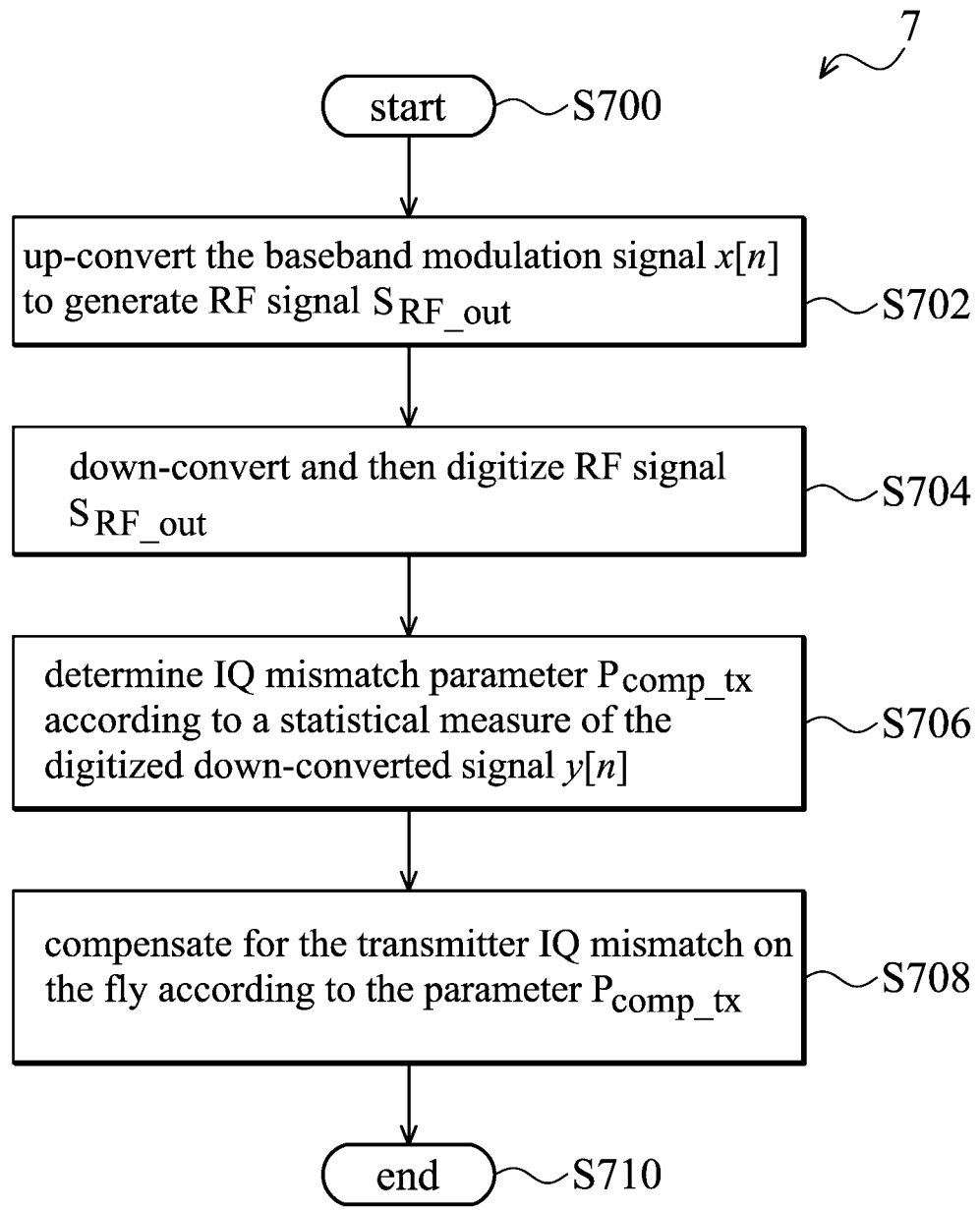
FIG. 7 is a flowchart of an exemplary IQ mismatch compensation method 7 for a transmitter according to an embodiment of the invention.

FIG. 7 is a flowchart of an exemplary IQ mismatch compensation method 7 for a transmitter according to an embodiment of the invention, explaining the detailed transmitter IQ compensation procedure in Step S504 in FIG. 5. Upon startup, the receiver 12 is initialized for transmitting RF modulation signals (S700). The transmitter 12 receives the baseband modulation signal x[n] to perform the frequency up-conversion thereon to generate the transmitted RF signal $S_{RF\_out}$ on the fly for transmission or IQ imbalance calibration (S702). The baseband modulation signal x[n] may be the modulation data for transmission under the normal operation mode, or a predetermined modulation data x[n] with a predetermined length L, each modulation data in the sequence is statistically independent to one another. The predetermined modulation data may be generated by a signal generator (not shown), which may be realized by a memory module (not shown) and a digital modulator (not shown) feeding the generated modulation data x[n] to the transmitter IQ mismatch compensator 100. The memory module may store a predetermined test pattern with length L and the digital modulator converts the predetermined test pattern to the predetermined modulation data. The transmitted RF signal $S_{RF\_out}$ is fed back through an internal path (attenuator 18) to the receiver 12, which subsequently down-converts, filters, and digitizes the transmitted RF signal $S_{RF\_out}$ to produce the discrete baseband modulation signal y[n] (S704), which is passed to the transmitter IQ mismatch detector 134 to determine the transmitter IQ compensation parameter $P_{comp\_tx}$ based on the statistical independence of each baseband modulation signal y[n] (S706). Next, the transmitter IQ mismatch compensator 100 receives the transmitter IQ compensation parameter $P_{comp\_tx}$ to compensate for the transmitter IQ imbalance on the fly (S708), thereby reducing or minimize the statistical correlation between each discrete baseband modulation signal y[n]. The receiver IQ compensation method is then completed and exited (S710). The receiver IQ mismatch compensator can be implemented by the circuits in FIG. 2 or FIG. 4.

In one embodiment, the receiver IQ mismatch compensator 134 is implemented by the circuit 2 in FIG. 2, deploying the wanted signal parameter $A_t$ adjusting for the wanted signal component and the unwanted image signal parameter $B_t$ adjusting for the unwanted image signal component. During the initialization, the $A_t$ is set to 1 and $B_t$ is 0, i.e., no compensation for the unwanted image signal component is performed. After the transmitter IQ compensation parameter $P_{comp\_tx}$ is determined by the transmitter IQ mismatch detector 134, the wanted signal parameter $A_t$ and unwanted signal parameter $B_t$ are updated by $\overline{A_t}$ and $\overline{B_t}$ respectively to remove the unwanted signal component accordingly. Each time when the system environment of the wireless communication device changes, the IQ mismatch detector 134 determines a new set of parameters $A_t$ and $B_t$ to adaptively correct the new IQ imbalance arising from the system environment change.

Figure 8:
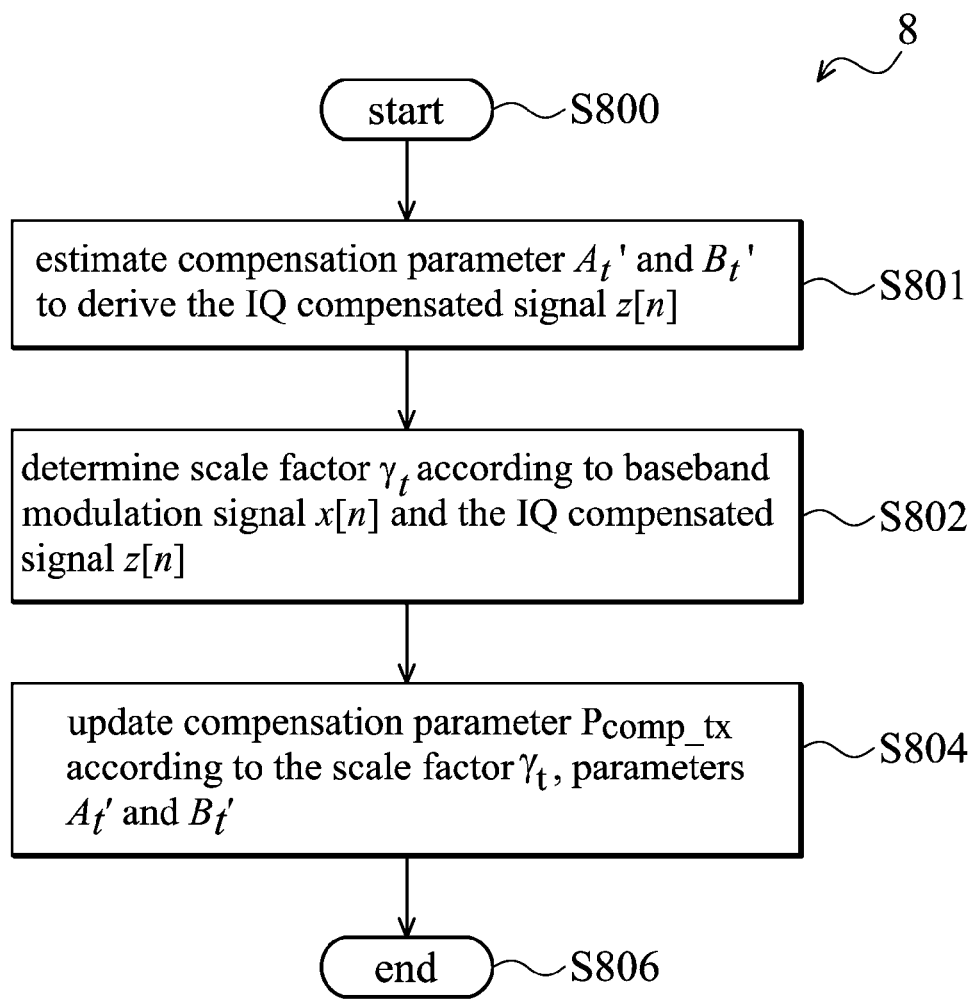
FIG. 8 is a flowchart of an exemplary scale factor compensation method 8 for a transceiver according to an embodiment of the invention.

FIG. 8 is a flowchart of an exemplary initial phase mismatch compensation method 8 for a transceiver according to an embodiment of the invention, incorporated in Step S606 in FIG. 6. The transmitter IQ mismatch compensator 100 also compensates for the initial phase difference between the modulation and demodulation frequencies. The initial phase compensation is performed after the completion of the IQ mismatch compensation. Upon startup of the initial phase compensation method 8 (S800), the transmitter IQ mismatch compensator 100 estimates compensation parameter $A_t$ and $B_t$ to derive the IQ compensated signal z[n] (S801) and determines a scale factor $\gamma_t$ according to the original baseband modulation signal x[n] and the IQ mismatch compensated modulation signal z[n] (S802). In some implementations, the transmitter IQ mismatch compensator 100 determines the scale factor $\gamma_t$ by evaluating the cross-correlation between the baseband modulation signal x[n] and the IQ mismatch compensated modulation signal z[n], i.e., $\gamma_t = E\{z[n]x^*[n]\}$. Next the transmitter IQ mismatch compensator 100 updates the transmitter compensation parameter according to the scale factor $\gamma_t$ as well as parameters $A_t'$ and $B_t'$ (S804), Thus, completing the initial phase mismatch compensation method 8 (S806). In some embodiments, the transmitter IQ mismatch compensator 100 is implemented by the circuit in FIG. 2, and the transmitter compensation parameter comprises the wanted signal parameter $A_t$ adjusting for the wanted signal component and the unwanted image signal parameter $B_t$ adjusting for the unwanted image signal component. The computation procedure of the compensation parameters $A_t$ and $B_t$ can find reference in the preceding paragraphs for FIG. 2D, thus the details thereof will be omitted here for brevity.

Figure 9A:
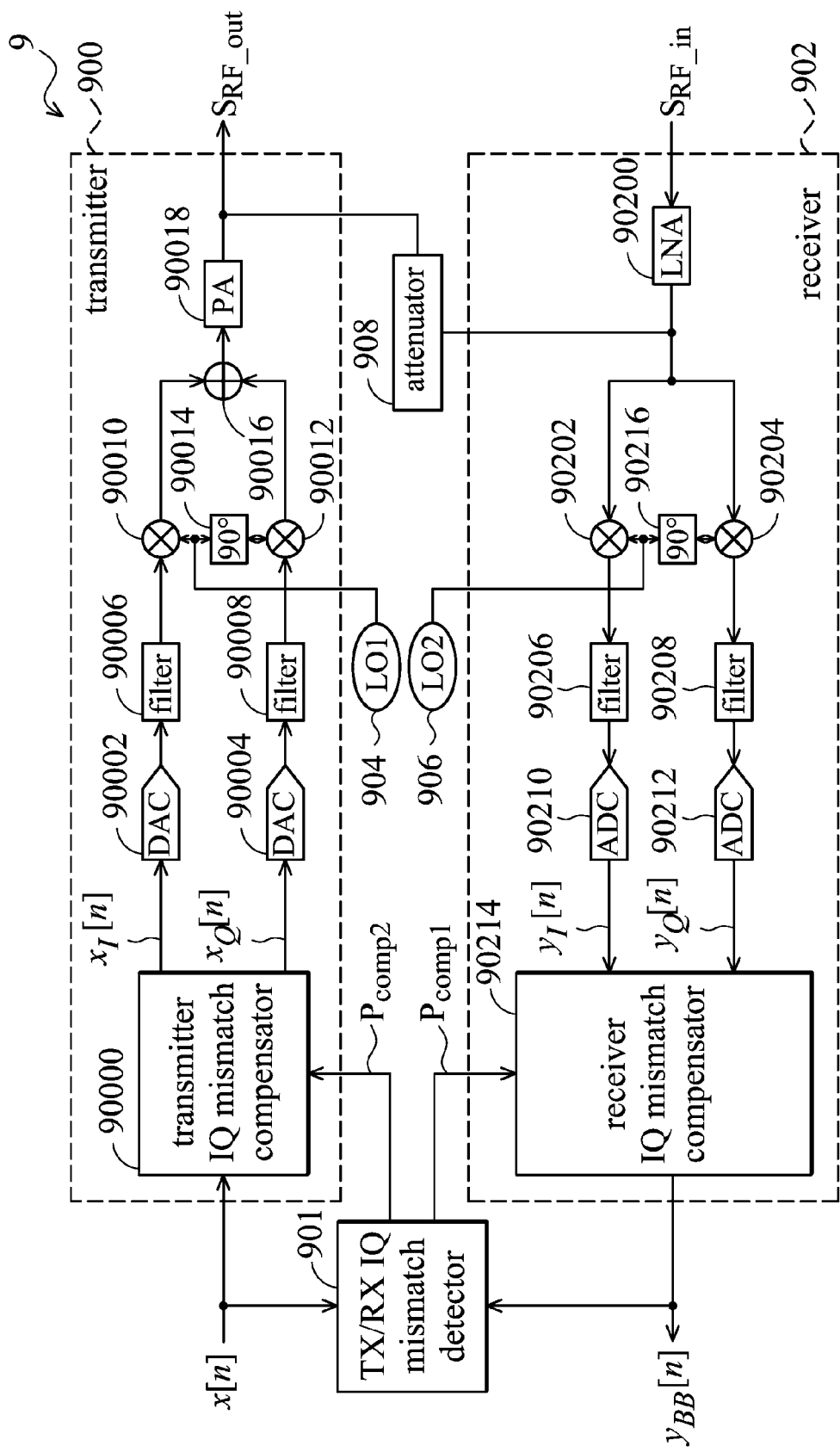
FIG. 9A is a block diagram of an exemplary transceiver 9 for a low-IF architecture according to another embodiment of the invention.

FIG. 9A is a block diagram of an exemplary transceiver 9 according to another embodiment of the invention. The transceiver 9 can be used in both the zero-IF and low-IF architectures. Reference to the zero-IF operation can be found in the preceding paragraphs and will not be explained here for brevity. The operation of the low-IF transceiver 9 is similar to the zero-IF transceiver 1 but requires full image-reject mixers for up-conversion and down-conversion. When low IF architecture is utilized, two stages of frequency conversion are performed by the transceiver, with an intermediate frequency (IF) being an intermediate stage of transforming the frequency of the modulation signal between the baseband frequency and the RF frequency. Typical values for the IF are between a few hundreds of kilohertz and few megahertz. The digital down-conversion is performed in the digital domain such that a high degree of image rejection can be maintained. The transceiver in FIG. 9A may be implemented in a communication device for a TDD communication system including WiMAX, WiFi, bluetooth, TD-SCDMA, or TD-LTE system, and requires two oscillators to provide a first oscillation signal and a second oscillation signal to the transmitter 900 and the receiver 902.

In the case of the zero-IF architecture, the first and second local oscillators provide first and second oscillation signals with substantially the same oscillation frequency to the transmitter and receiver respectively. In the case of the low-IF architecture, the first and second local oscillators provide the first and second oscillation signals with a frequency difference therebetween to the transmitter and receiver, with the first oscillation frequency of the first oscillation signal exceeding the second oscillation frequency of the second oscillation signal. Instead of compensating the IQ mismatch for the transmitter and the receiver in separate IQ compensation procedures, the transceiver 9 performs a joint on-the-fly transmitter/receiver IQ calibration that reduces or removes the effect of IQ mismatch from both the transmitter 900 and receiver 902 by the IQ mismatch detector 901, the receiver IQ mismatch compensator 90214, and the transmitter IQ mismatch compensator 90000. The IQ mismatch detector 901 detects the transmitter and receiver IQ imbalance and determines first and second compensation parameters to compensate for the IQ imbalance. The receiver IQ mismatch compensator 90214 receives the first compensation parameter $P_{comp1}$ for the receiver IQ compensation, and then the transmitter IQ mismatch compensator 90000 obtains the second compensation parameter $S_{comp2}$ for the transmitter IQ compensation. Like the transceiver 1, the transceiver 9 executes the joint IQ mismatch compensation on the fly so that the IQ imbalance of the transmitter 900 and receiver 902 can be corrected without interruption to the normal operations of the communication device. The IQ mismatch detector 901 may be implemented by the principle similar to transmitter IQ mismatch detector 134 as detailed in the description of the zero-IF transceiver 1 according to the embodiment. The receiver IQ mismatch compensator 90214 and the transmitter IQ mismatch compensator 90000 can be implemented by the compensator circuit in the FIG. 2 or the FIG. 4.

Figure 9B:
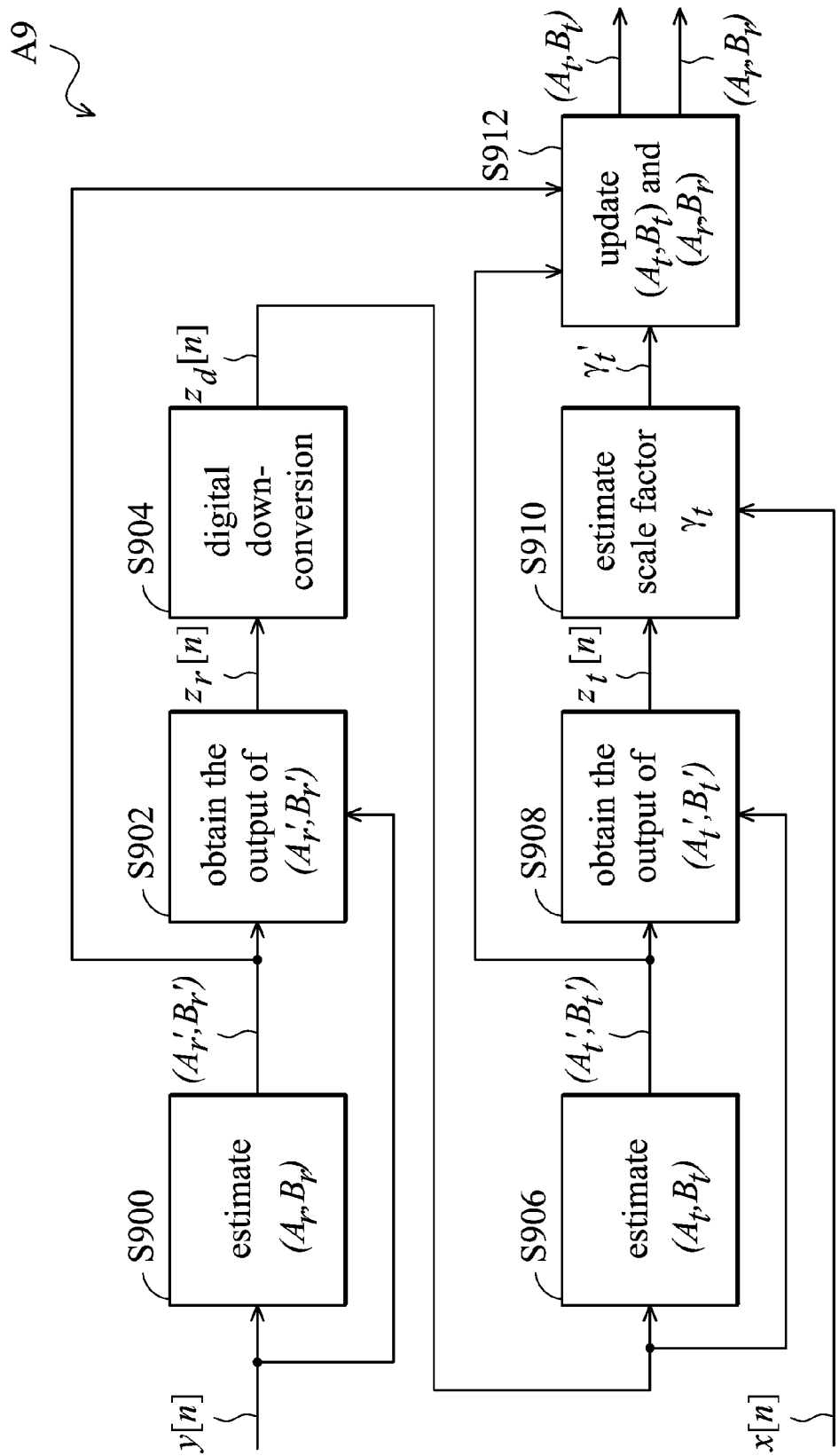
FIG. 9B is a flowchart of a joint TX/RX IQ calibration algorithm A9 according to an embodiment of the invention.

FIG. 9B is a flowchart of a TX/RX IQ calibration algorithm A9 according to an embodiment of the invention, incorporating the transceiver 9 in FIG. 9A. Upon initialization of the transmitter IQ calibration algorithm A1, the transmitter compensation parameter $P_{comp\_tx}$ and the receiver compensation parameter $P_{comp\_rx}$ are reset. The transmitter compensation parameter $P_{comp\_tx}$ comprises a wanted signal parameter $A_t$ and an image signal parameter $B_t$. Similarly, the receiver compensation parameter $P_{comp\_rx}$ comprises a wanted signal parameter $A_r$ and an image signal parameter $B_r$. During the initialization, the signal parameter $A_t$ and $A_r$ are set to 1 and the image signal parameter $B_t$ and $B_r$ are set to 0. The IQ mismatch detector 901 determines the receiver IQ mismatch according to the a first statistical measure of the baseband signal $y_{BB}[n]$ and generates the receiver compensation parameters $A_r$ and $B_r$ (S900). Thus the receiver IQ mismatch compensator 90214 can compensate the baseband signal $y_{BB}[n]$ using compensation parameters $A_r$ and $B_r$ to output a receiver compensated signal $z_r[n]$ (S902). Next, the IQ mismatch detector 901 down-converts the receiver compensated signal $z_r[n]$ by the frequency difference between the transmitter and receiver frequencies (S904) to produce an down-converted signal $z_d[n]$, determines a second statistical measure of signal components in the down-converted signal $z_d[n]$, and further determines the transmitter compensation parameters $A_t$ and $B_t$ based on the down-converted signal $z_d[n]$ (S906). The transmitter IQ mismatch compensator 90000 then compensates the modulation signal x[n] using the transmitter compensation parameters $A_t$ and $B_t$ to output the compensated signal $z_t[n]$ (S908). The transmitter IQ mismatch compensator 90000 determines the scale factor $\gamma_t$ by evaluating the cross-correlation between the baseband modulation signal x[n] and the IQ mismatch compensated modulation signal $z_t[n]$ by the relationship $\gamma_t = E\{z_t[n]x^*[n]\}$ (S910). The transmitter IQ mismatch compensator 90000 updates the transmitter compensation parameters $A_t$ and $B_t$ according to the estimated compensation parameters $A_t'$ and $B_t'$ and the scale factor $\gamma_t$, (S912) by Eq. (1) and Eq. (2) as disclosed in FIG. 1B (S912). The receiver IQ mismatch compensator 90214 updates the receiver compensation parameters $A_r$ and $B_r$ according to the estimated compensation parameters $A_t'$ and $B_t'$ by the following (S912):

$$\overline{A_t} = A_r'A_r + B_r'B_r^* \qquad \text{Eq. (3)}$$

$$\overline{B_t} = B_r'A_r^* + A_r'B_r \qquad \text{Eq. (4)}$$

where $\gamma_t$ is the scale factor;

$A_r$ and $B_r$ are previous receiver compensation parameters;

$A_t'$ and $B_t'$ are the estimated receiver compensation parameters; and $\overline{A_r}$ and $\overline{B_r}$ are updated receiver compensation parameters.

Figure 10A:
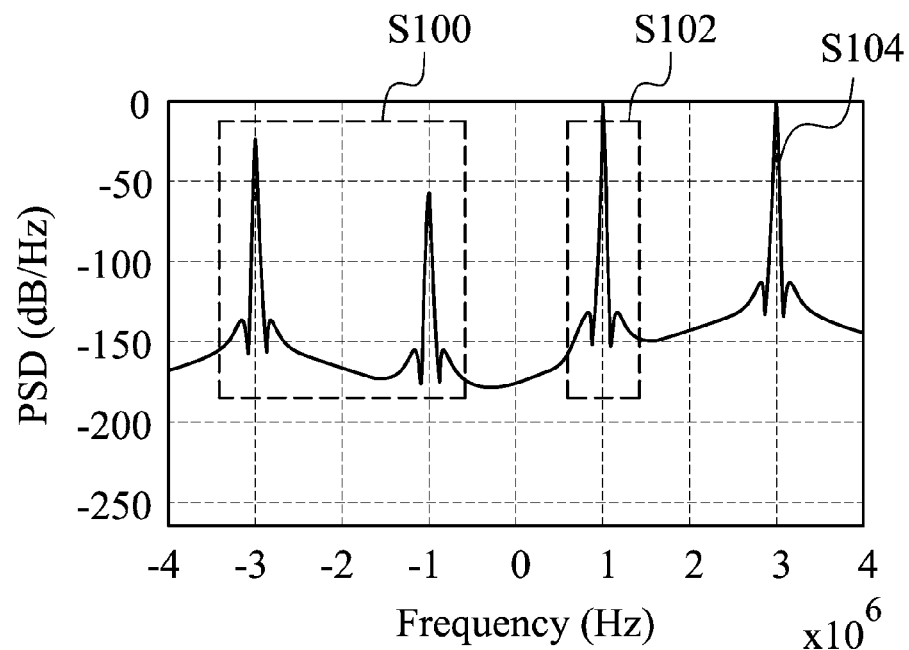
FIGS. 10A, 10B, and 10C are frequency spectrum diagrams indicating signal components at different stages of the joint TX/RX IQ calibration algorithm A9 according to the invention.
Figure 10B:
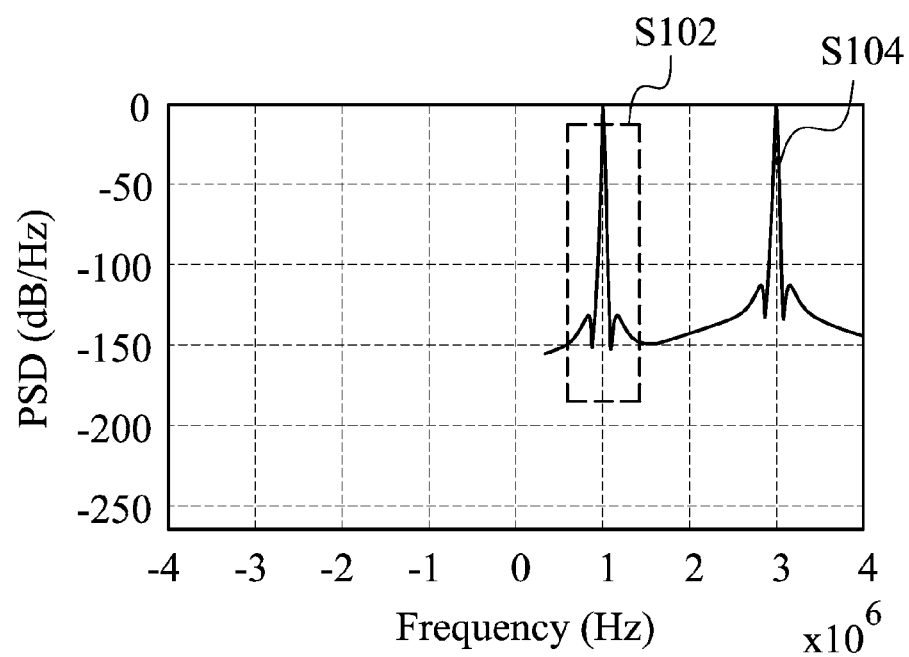
Figure 10C:
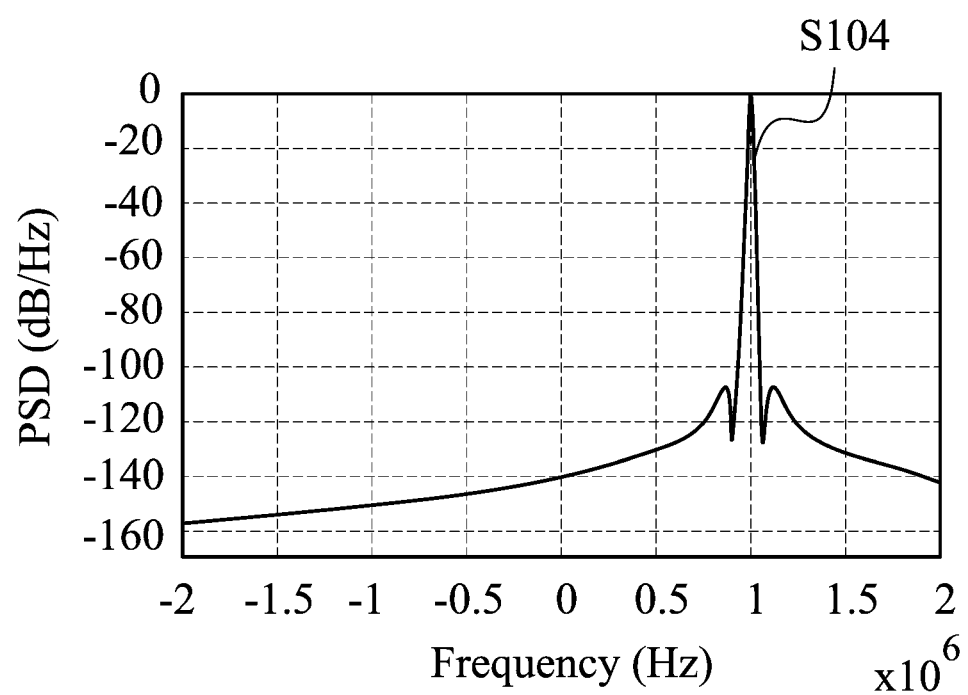

When performing the joint IQ mismatch compensation, a modulation signal is executed by the transmitter 900, then looped back through the internal feed path via the attenuator 904 to the receiver 902 (loop-back circuit), and processed by the receiver 902. Since both the transmitter 900 and receiver 902 have IQ mismatch, the modulation signal is affected by both the transmitter and receiver IQ mismatch as the modulation signal is processed along the transmitter and receiver paths. Consequently the transceiver 9 needs to reduce or remove the transmitter and receiver IQ mismatch on the signal path. FIGS. 10A, 10B, and 10C show frequency spectrum diagrams indicating signal components of the modulation signal at different stages of the TX/RX IQ calibration algorithm A9, where the vertical axis represents power spectral density (PSD) in dB/Hz and the horizontal axis represents spectrum frequency in Hz. After processed by the receiver 902 (FIG. 10A), the recovered modulation signal $y_{BB}[n]$ comprises a first unwanted image signal S100 due to the receiver IQ imbalance, a second unwanted image signal S102 due to the transmitter IQ imbalance, and the a wanted signal S104. The low IF transceiver 9 removes the first unwanted image signal S100 then the second unwanted image signal S102 (FIG. 10B) to recover the wanted signal S104 (FIG. 10C). The recovered modulation signal $y_{BB}$ is sent to the IQ mismatch detector 901 to obtain the receiver IQ imbalance and generate the first compensation parameter $P_{comp1}$ corresponding to the receiver IQ mismatch for correcting the IQ imbalance by the receiver IQ mismatch compensator 924. After the receiver IQ compensation, the IQ mismatch detector 901 then determines the transmitter IQ mismatch based on the receiver IQ compensated signal $y_{BB}'[n]$ and generate the second compensation parameter $P_{comp2}$ corresponding to the transmitter IQ mismatch for the transmitter IQ mismatch compensator 900.

Figure 11:
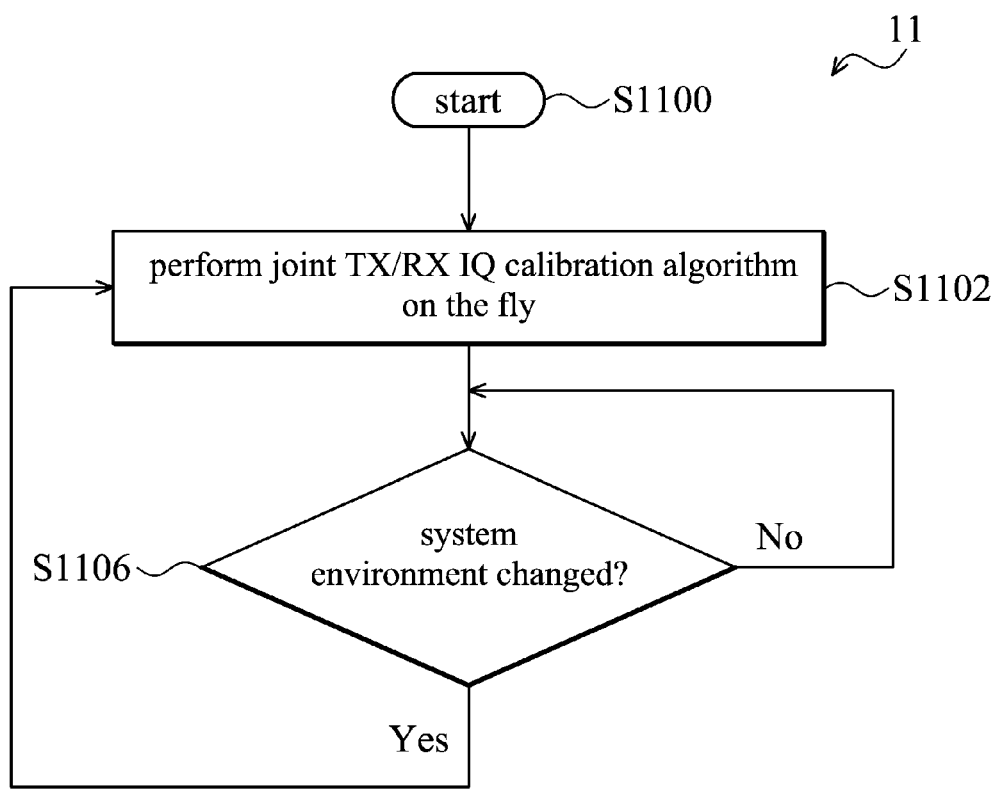
FIG. 11 is a flowchart of an exemplary joint TX/RX IQ mismatch compensation method 11 according to another embodiment of the invention.

FIG. 11 is a flowchart of an exemplary joint TX/RX IQ mismatch compensation method 11 according to another embodiment of the invention, incorporating the low IF transceiver 9 in FIG. 9A. The joint TX/RX IQ mismatch compensation method 11 is identical to the IQ mismatch compensation 6 except that a joint IQ mismatch compensation is carried out to account for the transmitter and receiver IQ mismatch in one procedure. Upon startup, the transceiver 10 is initialized to perform normal transmission and reception (S1100), and compensates for the transmitter and receiver IQ mismatch on the fly (S1102), monitors the system environment for any change thereof (S1106), and returns to step S1102 to recalibrate the IQ imbalance if there is. Step S1102 may comprise removing the initial phase mismatch between the transmitter and the receiver. The joint IQ mismatch compensation procedure is detailed in FIG. 13. In the joint on-the-fly IQ mismatch method 11, both the receiver and the transmitter IQ imbalance can be calibrated when the communication device is in normal operation, so that the communication device can adaptively change the compensation parameters thereof and correctly account for the IQ mismatch due to a change in the system environment of the communication device.

Figure 12:
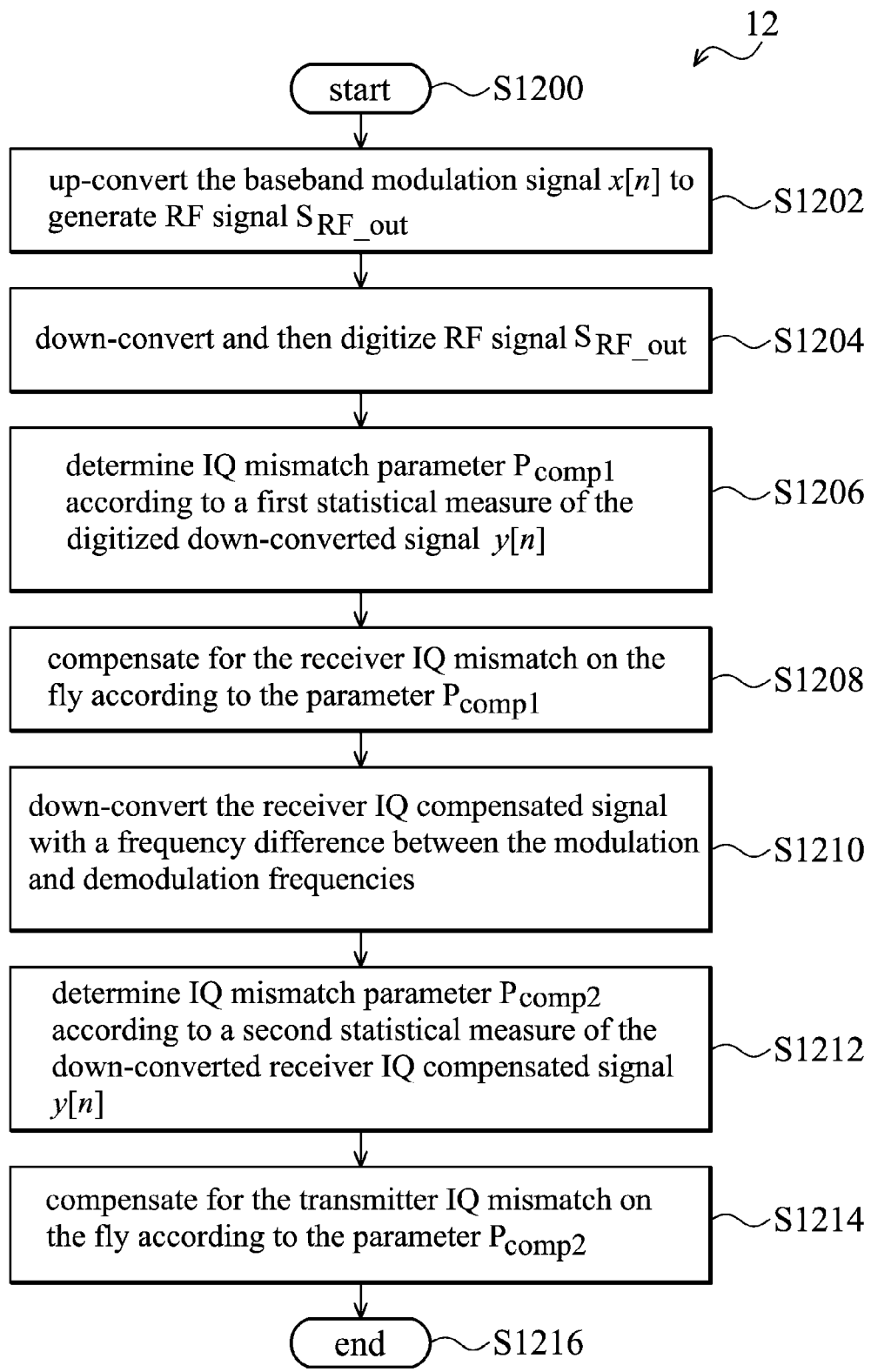
FIG. 12 is a flowchart of an exemplary joint IQ mismatch compensation method 12 according to another embodiment of the invention.

FIG. 12 is a flowchart of an exemplary joint IQ mismatch compensation method 12 according to another embodiment of the invention, which is incorporated in the Step S1102 in FIG. 11. Upon startup, the transceiver 9 is initialized for the data transmission and compensation of IQ imbalance in the transmitter 900 and receiver 902 (S1200). The transmitter 900 executes the baseband modulation signal for the normal transmission operation or a predetermined baseband modulation signal along the transmitter path to output the transmitted RF signal $S_{RF\_out}$ (S1202), which in turn is looped back through an internal loop-back path via the attenuator 908, and processed along the receiver path in the receiver 902 (loop-back circuit) to derive a discrete time-domain modulation signal $y_{BB}[n]$ (S1204) to be outputted to the IQ mismatch detector 901 (S1204). Refer to the FIG. 10A, the discrete time-domain modulation signal $y_{BB}[n]$ comprises unwanted signal components S100 and S102, and the wanted signal component S104. The receiver IQ mismatch compensation involves removing the signal component S100 that comprises image signals deduced by the receiver IQ mismatch. The IQ mismatch detector 901 determines the receiver IQ mismatch according to the a first statistical measure of the modulation signal $y_{BB}[n]$ and generates the first compensation parameter $P_{comp1}$ correspondingly to output to the receiver IQ mismatch compensator 90214 for compensation (S1206). The IQ mismatch detector 901 determines the statistical independence between receiver image signal components S100 and the transmitter signal components S102 and S104 to derive the first statistical measure and computes the first compensation parameter $P_{comp}$ based on the first statistical measure. The receiver IQ mismatch compensator 90214 then compensates for the IQ mismatch thereof using the first compensation parameter $P_{comp1}$ to reduce or remove the receiver image signal component S100 from the modulation signal $y_{BB}[n]$ (S1208). After the receiver IQ compensation, the compensated modulation signal $y_{BB}[n]$ now comprises the wanted signal component S104 and the unwanted image signal component S102 that needs to be suppressed, as illustrated in FIG. 10B. Thus, the IQ mismatch detector 901 down-converts the compensated modulation signal $y_{BB}[n]$ by the frequency difference between the transmitter and receiver frequencies (S1210), determines a second statistical measure of signal components in the down-converted compensated modulation signal, and further determines a second compensation parameter $P_{comp2}$ based on the down-converted compensated modulation signal (S1212). The IQ mismatch detector 901 down-converts the modulation signal $y_{BB}[n]$ to derive the down-converted compensated modulation signal, such that the 0 frequency falls in the middle of the unwanted image component S102 and the wanted signal component S104. The IQ mismatch detector 901 determines the statistical independence between the unwanted image component S102 and the wanted signal component S104 to derive the second statistical measure and the second compensation parameter $P_{comp2}$ corresponding thereto. Next, the second compensation parameter $P_{comp2}$ is sent to the transmitter IQ mismatch compensator 90000 to be processed to reduce or remove the unwanted image signal component S102 (S1214), thereby completing the transmitter IQ mismatch compensation and exiting the joint IQ mismatch compensation method (S1216).

Figure 13:
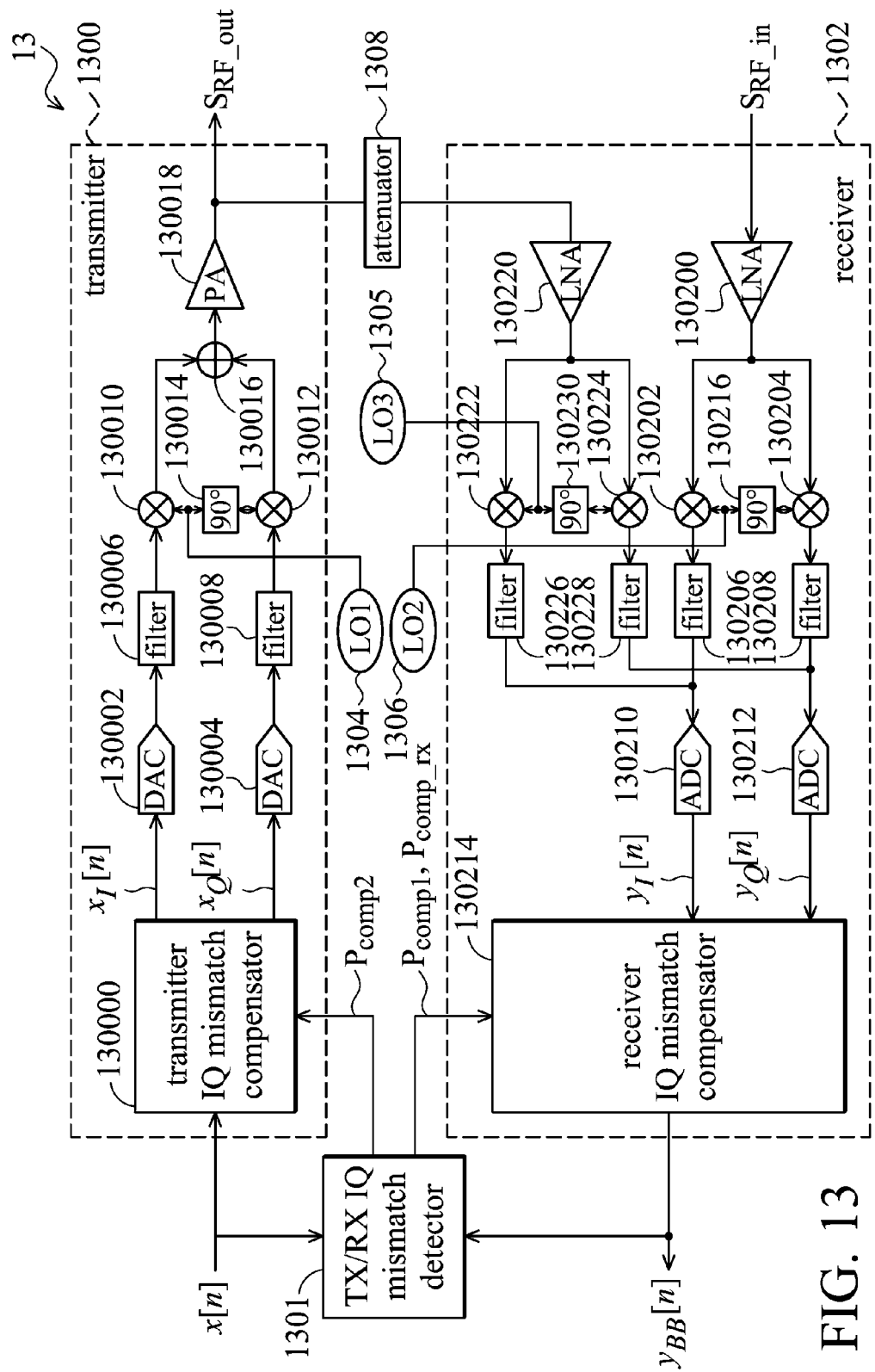
FIG. 13 is a block diagram of an exemplary transceiver 13 for a low-IF architecture according to another embodiment of the invention.

FIG. 13 is a block diagram of an exemplary transceiver 13 for a low-IF architecture according to another embodiment of the invention. The transceiver 13 may be implemented in a communication device for a TDD or a frequency division duplexing (FDD) communication system including Asymmetric Digital Subscriber Line (ADSL), Universal Mobile Telecommunications System (UMTS), CDMA 2000, and WiMAX systems in the FDD mode. In the FDD system, the communication devices communicate to one another through uplink and downlink communication at different frequencies.

The transceiver 13 is identical to the transceiver 9, except that an additional feedback circuit is incorporated therein to provide the internal loop-back path from the transmitter 1300 to the receiver 1302. The transceiver 13 is required to provide uplink and downlink communication at different frequencies. Thus, the feedback circuit is incorporated to reduce signal coupling effect between the PA 130018 and the LNA 130200. Since the transceiver 13 comprises a dedicated receiver path on the top of the transmitter and the loop-back path, a dedicated receiver IQ imbalance compensation for the receiver path is implemented to remove the IQ mismatch thereof before carrying out the joint IQ mismatch compensation accounting for the transmitter and the loop-back path. In comparison to the IQ mismatch detector 901, the IQ mismatch detector 1301 further detects receiver IQ imbalance by computing a third statistical measure according to the discrete time-domain baseband signal $y_{BB}[n]$ transformed from the received RF signal $S_{RF\_in}$ and determines compensation parameter $P_{comp\_rx}$ for the receiver path correspondingly, which is further received by the receiver IQ mismatch compensator 130213 to remove the receiver IQ compensation. The joint IQ compensation can be performed upon completion of the receiver IQ compensation. The IQ mismatch detector 1301 can be implemented by the principle similar to the transmitter IQ mismatch detector 134 as detailed in the zero-IF transceiver 1 according to the embodiment. The receiver IQ mismatch compensator 130213 and the transmitter IQ mismatch compensator 130000 can be implemented by the compensator circuit in the FIG. 2 or the FIG. 4. The receiver IQ compensation and the joint IQ compensation can be performed on the fly so that the IQ imbalance of the transmitter 1300 and receiver 1302 can be corrected while both are undergoing normal operations.

Figure 14:
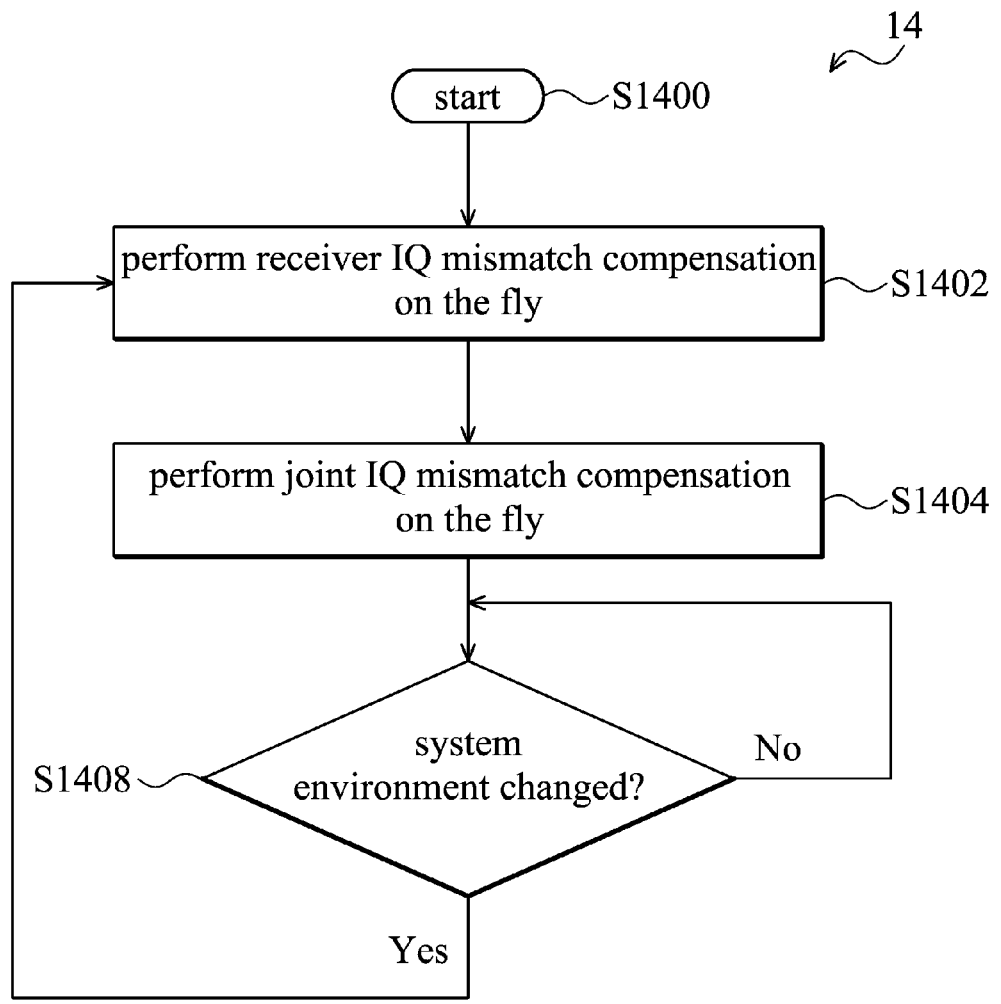
FIG. 14 is a flowchart of an exemplary IQ mismatch compensation method 14 incorporated in low-IF architecture according to another embodiment of the invention.

FIG. 14 is a flowchart of an exemplary IQ mismatch compensation method 14 incorporated in low-IF architecture according to another embodiment of the invention, incorporating the low IF transceiver 14 in FIG. 14. The IQ mismatch compensation method 14 is identical to the IQ mismatch compensation 11 except that an additional receiver IQ compensation step S1402 is inserted before the joint IQ mismatch compensation. In the IQ mismatch compensation method 14, the IQ imbalance on the receiver path, the transmitter path, and the loop-back can be calibrated when the communication device is in normal operation, so that the communication device can adaptively change the compensation parameters thereof and correctly account for the IQ mismatch due to a change in the system environment of the communication device.

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine.

The operations and functions of the various logical blocks, modules, and circuits described herein may be implemented in circuit hardware or embedded software codes that can be accessed and executed by a processor.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A transceiver capable of IQ mismatch compensation, comprising:

a transmitter circuit, configured to up-convert a modulation signal on the fly to generate a first RF signal for both radio transmission and IQ mismatch determination, wherein the first RF signal is passed to an antenna for radio transmission; and a loop-back circuit, configured to receive the first RF signal generated by the transmitter circuit, down-convert the first RF signal, and then digitize the down-converted first RF signal, the loop-back circuit comprising an IQ mismatch detector configured to receive both the modulation signal and the down-converted first RF signal, the IQ mismatch detector further configured to determine a first IQ mismatch parameter based on a first statistical measure of the digitized down-converted first RF signal in relation to the modulation signal, wherein the transmitter circuit further comprises a transmitter IQ mismatch compensator that receives the modulation signal and is configured to compensate for first IQ mismatch in the transmitter circuit according to the first IQ mismatch parameter determined by the IQ mismatch detector to generate an IQ compensated modulation signal.

2. The transceiver of claim 1, wherein the transmitter circuit is configured to up-convert the modulation signal by a first oscillation signal with a first oscillation frequency that is substantially identical to a second oscillation frequency of a second oscillation signal, which is used to down-convert the first RF signal in the loop-back circuit.

3. The transceiver of claim 1, wherein the loop-back circuit is further configured to receive a second RF signal from an air interface, down-convert the second RF signal and then digitize the down-converted second RF signal to determine a receiver IQ mismatch parameter based on a second statistical measure of the digitized down-converted second RF signal, and compensate for IQ mismatch of a receiver path therein according to the receiver IQ mismatch parameter.

4. The transceiver of claim 1, wherein the transmitter circuit is configured to up-convert the modulation signal with a first oscillation signal comprising a first frequency, and the loop-back circuit is configured to down-convert the first RF signal with a second oscillation signal comprising a second frequency, and the first oscillation frequency is different from the second oscillation signal by a frequency difference.

5. The transceiver of claim 4, wherein the loop-back circuit is further configured to compensate for second IQ mismatch in the loop-back circuit according to the first IQ mismatch parameter to generate a receiver IQ compensated signal, and down-convert the receiver IQ compensated signal with the frequency difference to determine the first IQ mismatch parameter based on a second statistical measure of the down-converted receiver IQ compensated signal, and the transmitter is configured to compensate for the first IQ mismatch in the transmitter circuit according to the second IQ mismatch parameter to generate the IQ compensated modulation signal.

6. The transceiver of claim 1, wherein the transmitter circuit is further configured to determine a scale factor according to the modulation signal and the IQ compensated modulation signal, and scale the IQ compensated modulation signal with the scale factor.

7. The transceiver of claim 1, wherein the transmitter circuit comprises:
a complex conjugate unit, for receiving the modulation signal to generate a conjugate thereof;
a complex multiplier, for multiplying the conjugate of the modulation signal by the first IQ mismatch parameter to generate an IQ compensation signal; and
a complex adder, for adding the modulation signal and the IQ compensation signal together to generate the IQ compensated modulation signal.

8. The transceiver of claim 1, wherein the first IQ mismatch parameter comprises a first parameter and a second parameter, and the transmitter circuit comprises
a first complex multiplier, for multiplying the modulation signal by the first parameter to generate a first IQ compensation signal;
a complex conjugate unit, for receiving the modulation signal to generate a conjugate thereof;
a second complex multiplier, for multiplying the conjugate of the modulation signal by the second parameter to generate a second IQ compensation signal; and
a complex adder, for adding the first IQ compensation signal and the second IQ compensation signal together to generate the IQ compensated modulation signal.

9. The transceiver of claim 1, wherein the transmitter circuit is further configured to up-convert a single tone signal during startup of the transceiver for initial compensation of the first IQ mismatch in the transmitter circuit.

10. A compensation method, performed by a transceiver to compensate for IQ mismatch thereof, comprising:
up-converting a modulation signal to generate a first RF signal for both radio transmission and IQ mismatch determination;
passing the first RF signal to an antenna for radio transmission;
down-converting and digitizing the first RF signal;
directing the first RF signal to a loop-back circuit comprising an IQ mismatch detector configured to receive both the modulation signal and the down-converted first RF signal, the IQ mismatch detector further configured to determine a first IQ mismatch parameter based on a first statistical measure of the digitized down-converted first RF signal in relation to the modulation signal; and
compensating for first IQ mismatch in the transmitter circuit comprises a transmitter IQ mismatch compensator that receives the modulation signal according to the first IQ mismatch parameter to generate an IQ compensated modulation signal.

11. The compensation method of claim 10, further comprising up-converting the modulation signal on the fly by a first oscillation signal with a first oscillation frequency that is substantially identical to a second oscillation frequency of a second oscillation signal, which is used to perform the step of down-converting the first RF signal.

12. The compensation method of claim 10, further comprising:
receiving a second RF signal from an air interface;
down-converting and digitizing the second RF signal;
determining a receiver IQ mismatch parameter based on a second statistical measure of the digitized down-converted second RF signal; and
compensating for IQ mismatch of a receiver path therein according to the receiver IQ mismatch parameter.

13. The compensation method of claim 10, further comprising:
up-converting the modulation signal with a first oscillation signal comprising a first frequency; and
down-converting the first RF signal with a second oscillation signal comprising a second frequency,
wherein the first oscillation frequency is different from the second oscillation signal by a frequency difference.

14. The compensation method of claim 13, further comprising:
compensating for a second IQ mismatch in the loop-back circuit according to the first IQ mismatch parameter to generate a receiver IQ compensated signal;
down-converting the receiver IQ compensated signal with the frequency difference to determine the first IQ mismatch parameter based on a second statistical measure of the down-converted receiver IQ compensated signal; and
compensating for the first IQ mismatch in the transmitter circuit according to the second IQ mismatch parameter to generate the IQ compensated modulation signal.

15. The compensation method of claim 10, wherein the compensating for the first IQ mismatch further comprises determining a scale factor according to the modulation signal and the IQ compensated modulation signal, and scaling the IQ compensated modulation signal with the scale factor.

16. The compensation method of claim 10, further comprising:
receiving the modulation signal to generate a conjugate thereof;
multiplying the conjugate of the modulation signal by the first IQ mismatch parameter to generate an IQ compensation signal; and
adding the modulation signal and the IQ compensation signal together to generate the IQ compensated modulation signal.

17. The compensation method of claim 10, wherein the first IQ mismatch parameter comprises a first parameter and a second parameter, and the compensation method further comprises:
multiplying the modulation signal by the first parameter to generate a first IQ compensation signal;
receiving the modulation signal to generate a conjugate thereof;
multiplying the conjugate of the modulation signal by the second parameter to generate a second IQ compensation signal; and
adding the first IQ compensation signal and the second IQ compensation signal together to generate the IQ compensated modulation signal.

18. The compensation method of claim 10, further comprising up-converting a single tone signal during startup of the circuitry for initial compensation of the first IQ mismatch in the transmitter circuit.

19. A transceiver capable of IQ mismatch compensation, comprising:

a transmitter circuit comprising a transmitter IQ mismatch compensator that receives a modulation signal, the transmitter circuit configured to up-convert the modulation signal to generate a first RF signal for both radio transmission and IQ mismatch determination, wherein the first RF signal is passed to an antenna for radio transmission and passed to a loop-back circuit for IQ mismatch determination concurrently, the loop-back circuit, configured to receive the first RF signal generated by the transmitter circuit, down-convert the first RF signal, and then digitize the down-converted first RF signal, the loop-back circuit comprising an IQ mismatch detector configured to receive both the modulation signal and the down-converted first RF signal, the IQ mismatch detector further configured to determine a first IQ mismatch parameter based on a first statistical measure of the digitized down-converted first RF signal in relation to the modulation signal;

wherein the transmitter circuit is further configured to compensate for IQ mismatch in the transmitter circuit according to the IQ mismatch parameter determined by the loop-back circuit, and normal operation of the transceiver needs not to be hindered, interrupted or stopped when performing the IQ mismatch determination and compensation.

\* \* \* \* \*